United States Patent
Frost

(10) Patent No.: US 11,991,051 B2
(45) Date of Patent: May 21, 2024

(54) PROVIDING MOBILE DEVICE MANAGEMENT FUNCTIONALITIES

(71) Applicant: Citrix Systems, Inc., Fort Lauderdale, FL (US)

(72) Inventor: Simon Frost, Herts (GB)

(*) Notice: Subject to any disclaimer, the term of this patent is extended or adjusted under 35 U.S.C. 154(b) by 0 days.

(21) Appl. No.: 17/667,019

(22) Filed: Feb. 8, 2022

(65) Prior Publication Data
US 2022/0231920 A1    Jul. 21, 2022

Related U.S. Application Data

(60) Division of application No. 16/934,058, filed on Jul. 21, 2020, now Pat. No. 11,290,346, which is a
(Continued)

(51) Int. Cl.
*H04L 41/18* (2022.01)
*H04L 67/00* (2022.01)
(Continued)

(52) U.S. Cl.
CPC .............. *H04L 41/18* (2013.01); *H04L 67/34* (2013.01); *H04W 4/50* (2018.02); *H04W 12/086* (2021.01);
(Continued)

(58) Field of Classification Search
None
See application file for complete search history.

(56) References Cited

U.S. PATENT DOCUMENTS

| 5,889,953 A | 3/1999 | Thebaut et al. |
| 8,272,030 B1 * | 9/2012 | Annan ................. G06F 21/604 705/26.1 |

(Continued)

FOREIGN PATENT DOCUMENTS

| CN | 1894897 A | 1/2007 |
| CN | 102663842 A | 9/2012 |

(Continued)

OTHER PUBLICATIONS

International Search Report and Written Opinion of International Application No. PCT/US2013/078457, dated Sep. 28, 2105.
(Continued)

*Primary Examiner* — Phyllis A Book

(57) ABSTRACT

Methods, systems, computer-readable media, and apparatuses for providing mobile device management (MDM) functionalities are presented. In some embodiments, a pseudo device representative of a physical end user device may be established within a cloud computing environment. The pseudo device may be provisioned for use with MDM service providers and configured to receive commands from the MDM service providers on behalf of the physical end user device. In some embodiments, multiple pseudo devices each representative of a physical end user device may be established within a cloud computing environment. A first pseudo device may be provisioned for use with a first MDM service provider and configured to receive commands from the first MDM service provider on behalf of the physical end user device. A second pseudo device may be provisioned for use with a second MDM service provider and configured to receive commands from the second MDM service provider.

17 Claims, 16 Drawing Sheets

Related U.S. Application Data continuation of application No. 14/144,702, filed on Dec. 31, 2013, now Pat. No. 10,742,520.

(51) Int. Cl.
*H04W 4/50* (2018.01)
*H04W 12/086* (2021.01)
*H04W 12/37* (2021.01)
*G06F 9/455* (2018.01)

(52) U.S. Cl.
CPC ......... *H04W 12/37* (2021.01); *G06F 9/45533* (2013.01)

(56) References Cited

U.S. PATENT DOCUMENTS

| | | | | |
|---|---|---|---|---|
| 8,346,932 | B1* | 1/2013 | Holland | H04L 67/535 709/226 |
| 8,467,768 | B2 | 6/2013 | Mahaffey et al. | |
| 8,695,058 | B2 | 4/2014 | Batchu et al. | |
| 8,756,194 | B1 | 6/2014 | Merrells | |
| 2004/0230636 | A1* | 11/2004 | Masuoka | G06F 9/451 708/800 |
| 2004/0260800 | A1* | 12/2004 | Gu | H04L 61/5092 709/223 |
| 2005/0021713 | A1* | 1/2005 | Dugan | H04Q 3/0029 709/246 |
| 2005/0183035 | A1 | 8/2005 | Ringel et al. | |
| 2006/0014530 | A1 | 1/2006 | Denenberg et al. | |
| 2007/0180450 | A1* | 8/2007 | Croft | H04L 67/568 718/1 |
| 2009/0036111 | A1 | 2/2009 | Danford et al. | |
| 2009/0198772 | A1 | 8/2009 | Kim et al. | |
| 2009/0254843 | A1* | 10/2009 | Van Wie | H04L 67/131 707/999.005 |
| 2010/0100641 | A1* | 4/2010 | Quinlan | G06F 9/52 709/248 |
| 2011/0022641 | A1* | 1/2011 | Werth | H04L 67/125 707/E17.044 |
| 2011/0083138 | A1 | 4/2011 | Sivasubramanian et al. | |
| 2011/0314145 | A1 | 12/2011 | Raleigh et al. | |
| 2012/0079126 | A1 | 3/2012 | Evans et al. | |
| 2012/0172027 | A1 | 7/2012 | Partheesh et al. | |
| 2012/0179802 | A1 | 7/2012 | Narasimhan et al. | |
| 2012/0302204 | A1 | 11/2012 | Gupta et al. | |
| 2012/0302256 | A1 | 11/2012 | Pai et al. | |
| 2013/0247034 | A1* | 9/2013 | Messerli | G06F 9/45533 718/1 |
| 2013/0254849 | A1 | 9/2013 | Alison et al. | |
| 2013/0263257 | A1* | 10/2013 | O'Reirdan | H04L 61/4541 726/22 |
| 2014/0059226 | A1* | 2/2014 | Messerli | H04L 67/51 709/226 |
| 2014/0173125 | A1 | 6/2014 | Selvanandan | |
| 2014/0334334 | A1* | 11/2014 | Brzozowski | H04L 41/0806 370/254 |
| 2014/0380054 | A1* | 12/2014 | Roth | H04L 9/0822 713/171 |
| 2015/0087284 | A1 | 3/2015 | Moore et al. | |

FOREIGN PATENT DOCUMENTS

| | | | | |
|---|---|---|---|---|
| WO | | 2013151732 A1 | 10/2013 | |
| WO | WO-2014084967 A1 * | | 6/2014 | ............ G06F 21/00 |

OTHER PUBLICATIONS

"High-Level Design for a Secure Mobile Device Management System," Keunwoo Rhee et al., Human Aspects of Information Security, Privacy, and Trust, Jul. 21, 2013.
"A Mobile Device Management Framework for Secure Service Delivery," Leung et al., Information Security Technical Report, Aug. 1, 2008.
"Enterprise MDM: Feature Brief," Citrix, Aug. 1, 2012.
Aug. 19, 2016—(US) Non-final Office Action—U.S. Appl. No. 14/144,702.
May 2, 2017—(US) Final Office Aciton—U.S. Appl. No. 14/144,702.
Oct. 4, 2017—(US) Non-final Office Action—U.S. Appl. No. 14/144,702.
Jul. 20, 2018—(US) Final Office Action—U.S. Appl. No. 14/144,702.
May 30, 2019—(US) Non-final Office Action—U.S. Appl. No. 14/144,702.
Apr. 8, 2020—(US) Notice of Allowance—U.S. Appl. No. 14/144,702.
Page, Daniel, "Quick Instant Messaging Protocol; draft-dpage-qimp-00.txt", Internet Society (ISOC) 4, Oct. 1, 2000, XP015012551.
May 25, 2021—(US) Non-final Office Action—U.S. Appl. No. 16/934,058.
Nov. 16, 2021—(US) Notice of Allowance—U.S. Appl. No. 16/934,058.

* cited by examiner

PROVIDING MOBILE DEVICE MANAGEMENT FUNCTIONALITIES

CROSS-REFERENCE TO RELATED APPLICATION

This application is a divisional of U.S. application Ser. No. 16/934,058, filed Jul. 21, 2020, which is a continuation of, and claims priority to, U.S. application Ser. No. 14/144,702 filed Dec. 31, 2013, now U.S. Pat. No. 10,742,520. Each of these prior applications is incorporated herein by reference in its entirety.

BACKGROUND

Aspects of the disclosure relate to computer hardware and software. In particular, one or more aspects of the disclosure generally relate to computer hardware and software for providing mobile device management functionalities.

Increasingly, corporations and other organizations are providing and/or otherwise enabling their employees and other associates with mobile devices, such as smart phones, tablet computers, and other mobile computing devices. As these devices continue to grow in popularity and provide an increasing number of functions, many organizations may wish to place certain controls on how these devices can be used, what resources these devices can access, and how the applications running on these devices can interact with other resources.

SUMMARY

Various aspects of the disclosure provide more efficient, effective, functional, and convenient ways of controlling how mobile devices can be used, what resources mobile devices can access, and how the applications and other software running on these devices can interact with other resources. In particular, in one or more embodiments discussed in greater detail below, mobile device management functionalities are deployed, implemented, and/or used in a number of different ways to provide one or more of these and/or other advantages.

In some embodiments, a pseudo device may be established within a cloud computing environment. The pseudo device may be representative of a physical end user device. The pseudo device may be provisioned for use with one or more mobile device management (MDM) service providers. The pseudo device may be configured to receive one or more commands from the one or more MDM service providers on behalf of the physical end user device.

In some embodiments, multiple pseudo devices may be established within a cloud computing environment. Each pseudo device may be representative of a physical end user device. A first pseudo device may be provisioned for use with a first MDM service provider. A second pseudo device may be provisioned for use with a second MDM service provider. The first pseudo device may be configured to receive commands from the first MDM service provider on behalf of the physical end user device. The second pseudo device may be configured to receive commands from the second MDM service provider on behalf of the physical end user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
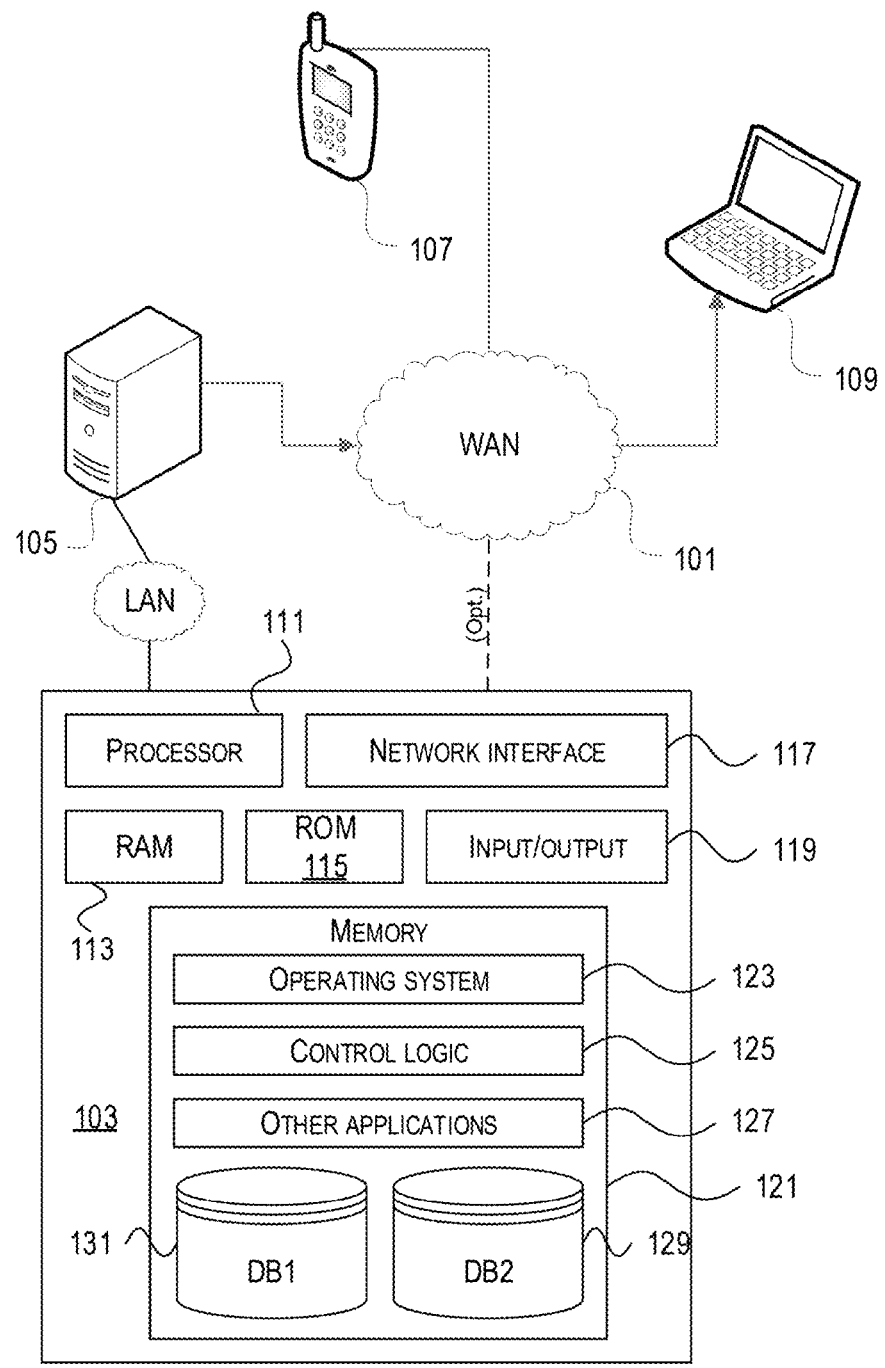
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
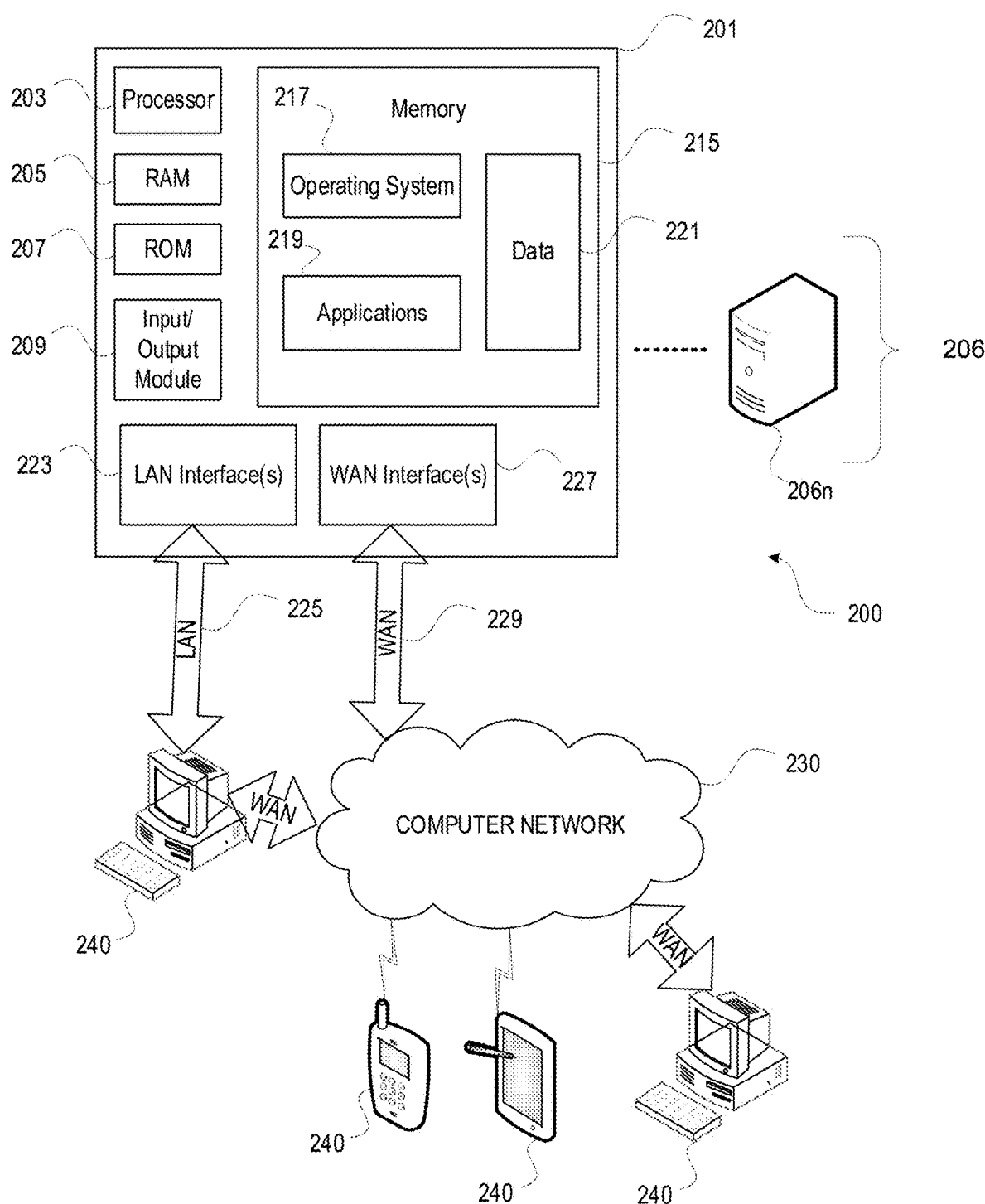
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
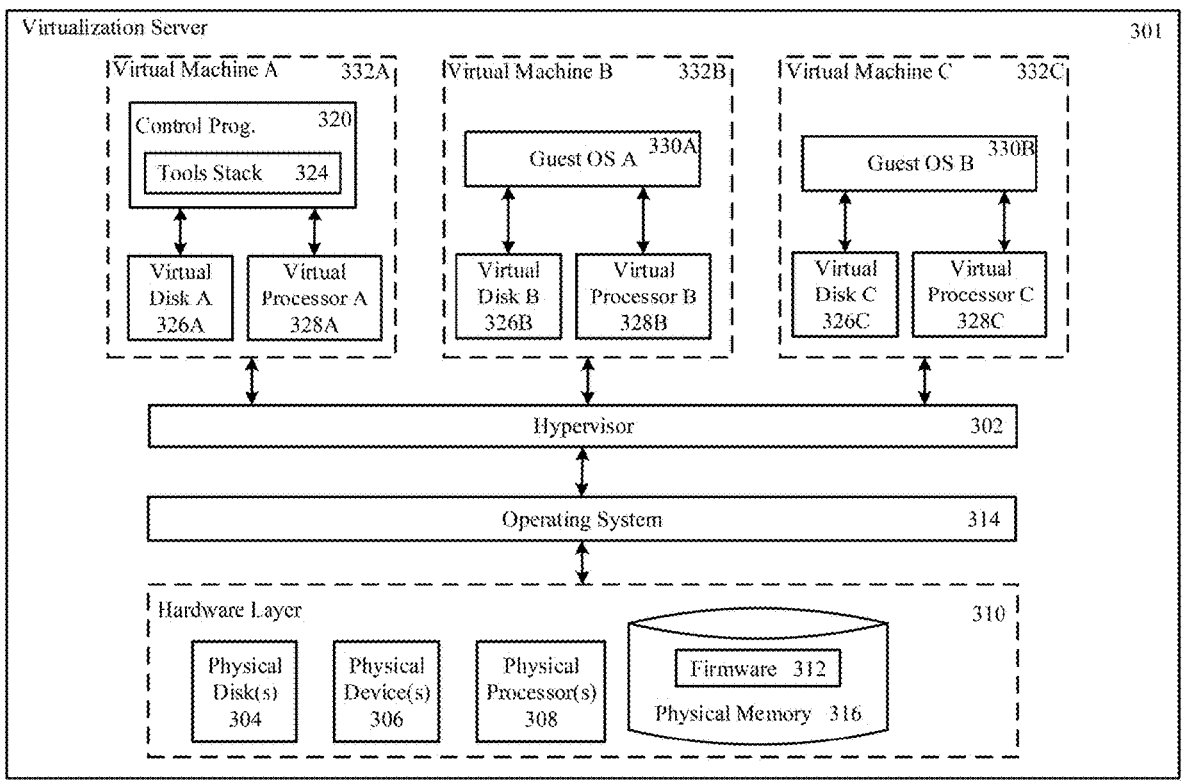
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
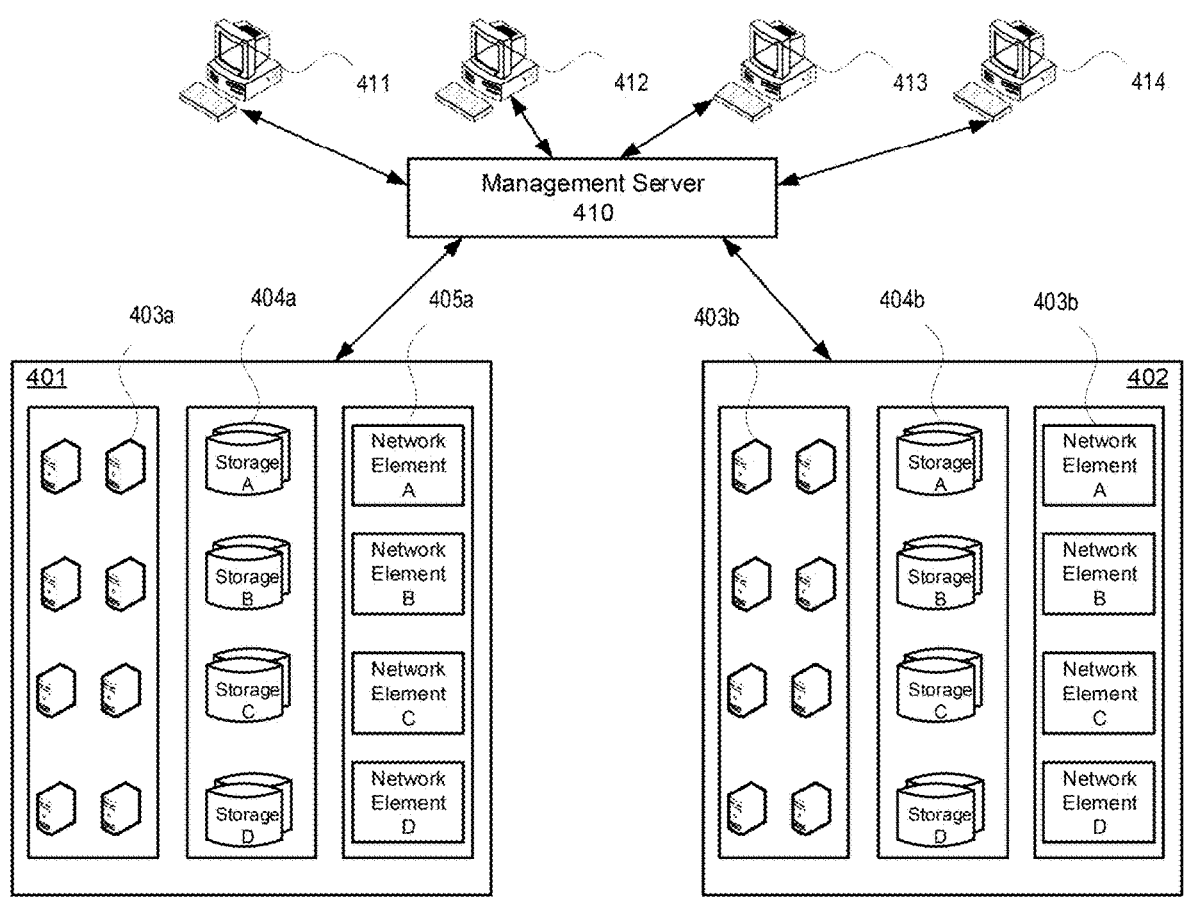
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
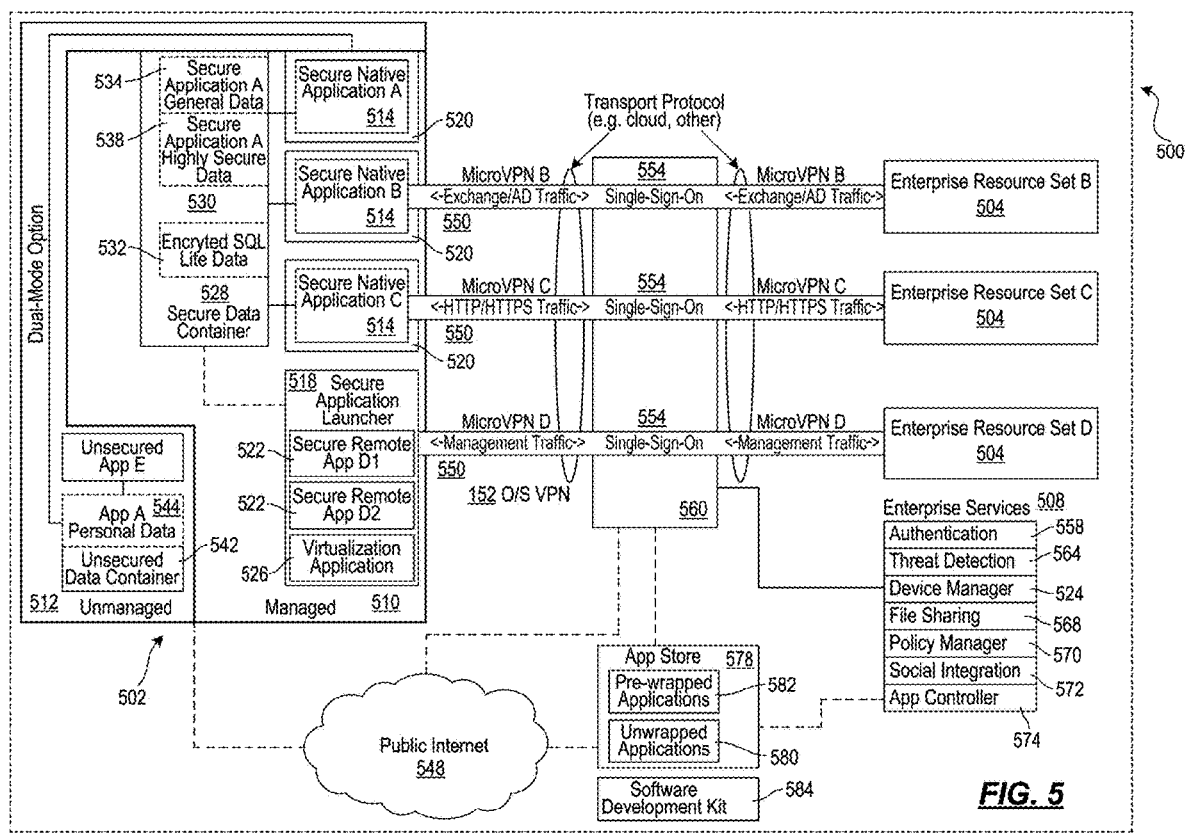
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device may run an iOS operating system, Android operating system, and/or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device or a managed device.

In some embodiments, the operating system of the mobile device may be separated into a managed partition 510 and an unmanaged partition 512. The managed partition 510 may have policies applied to it to secure the applications running on and data stored in the managed partition. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections (also referred to at microVPN or application-specific VPN) may be specific to particular applications 550, particular devices, particular secured areas on the mobile device, and the like (e.g., 552). For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use user interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability. The management and analytics capability may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
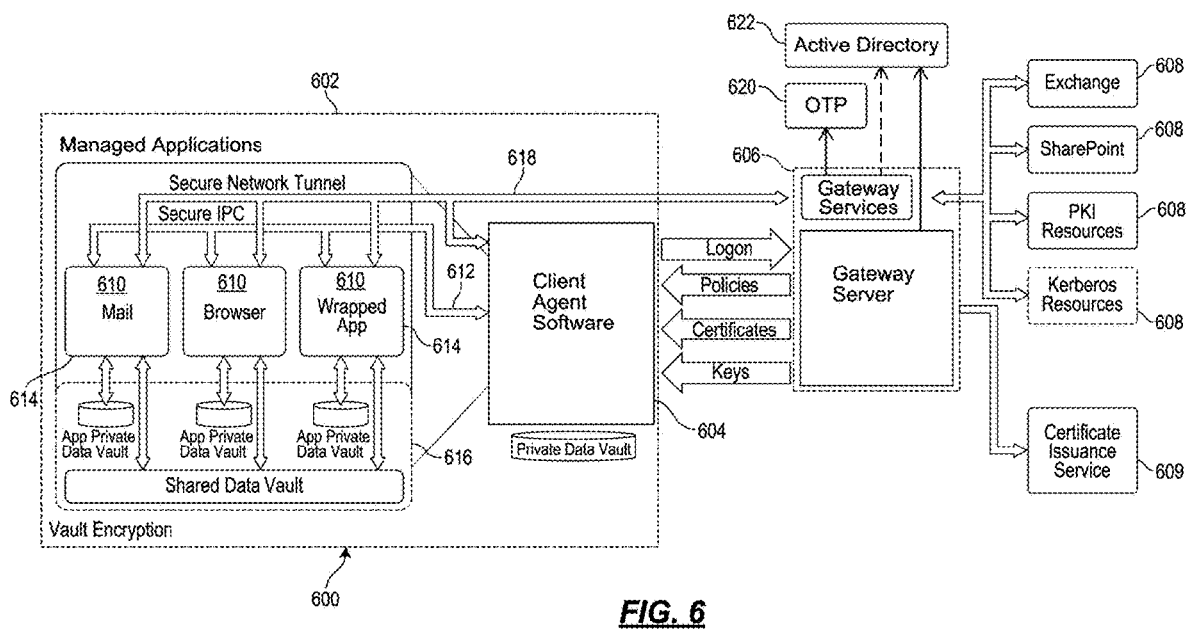
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled/managed mobile device 602 with a client agent 604, which interacts with gateway server 606 (which includes access gateway and application controller functionality) to access various enterprise resources 608 and services 609 such as Exchange, Sharepoint, PKI Resources, Kerberos Resources, and Certificate Issuance Service, as shown on the right hand side above. Although not specifically shown, the mobile device 602 may also interact with an application store for the selection and downloading of applications.

The client agent 604 acts as the UI (user interface) intermediary for Windows apps/desktops hosted in an Enterprise data center, which are accessed using a display remoting protocol, such as but not limited to the ICA protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and the application management framework (AMF) of this architecture act to provide policy driven management capabilities and features such as connectivity and SSO (single sign on) to enterprise resources/services 608. The client agent 604 handles primary user authentication to the enterprise, normally to the access gateway (AG) with SSO to other gateway server components. The client agent 604 obtains policies from gateway server 606 to control the behavior of the AMF managed applications 610 on the mobile device 602.

The secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through access gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The mail and browser managed applications 610 have special status and may make use of facilities that might not be generally available to arbitrary wrapped applications. For example, the mail application may use a special background network access mechanism that allows it to access Exchange over an extended period of time without requiring a full AD logon. The browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256-bit encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want the enterprise application store to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via a micro VPN feature). For example, an email application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the mail and browser managed applications, and ultimately by arbitrary wrapped applications (provided those applications use web service style communication patterns where it is reasonable for the application management framework to mediate HTTPS requests).

Client certificate support on iOS may rely on importing a PKCS 12 BLOB (Binary Large Object) into the iOS keychain in each managed application for each period of use. Client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP negotiate authentication challenges. The limited support feature relates to constrained delegation in AGEE, where AFEE supports invoking Kerberos protocol transition so it can obtain and use Kerberos service tickets (subject to constrained delegation) in response to HTTP negotiate authentication challenges. This mechanism works in reverse web proxy (a.k.a. CVPN) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of the enterprise application store and application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Enterprise Mobility Device Management Features

Figure 7:
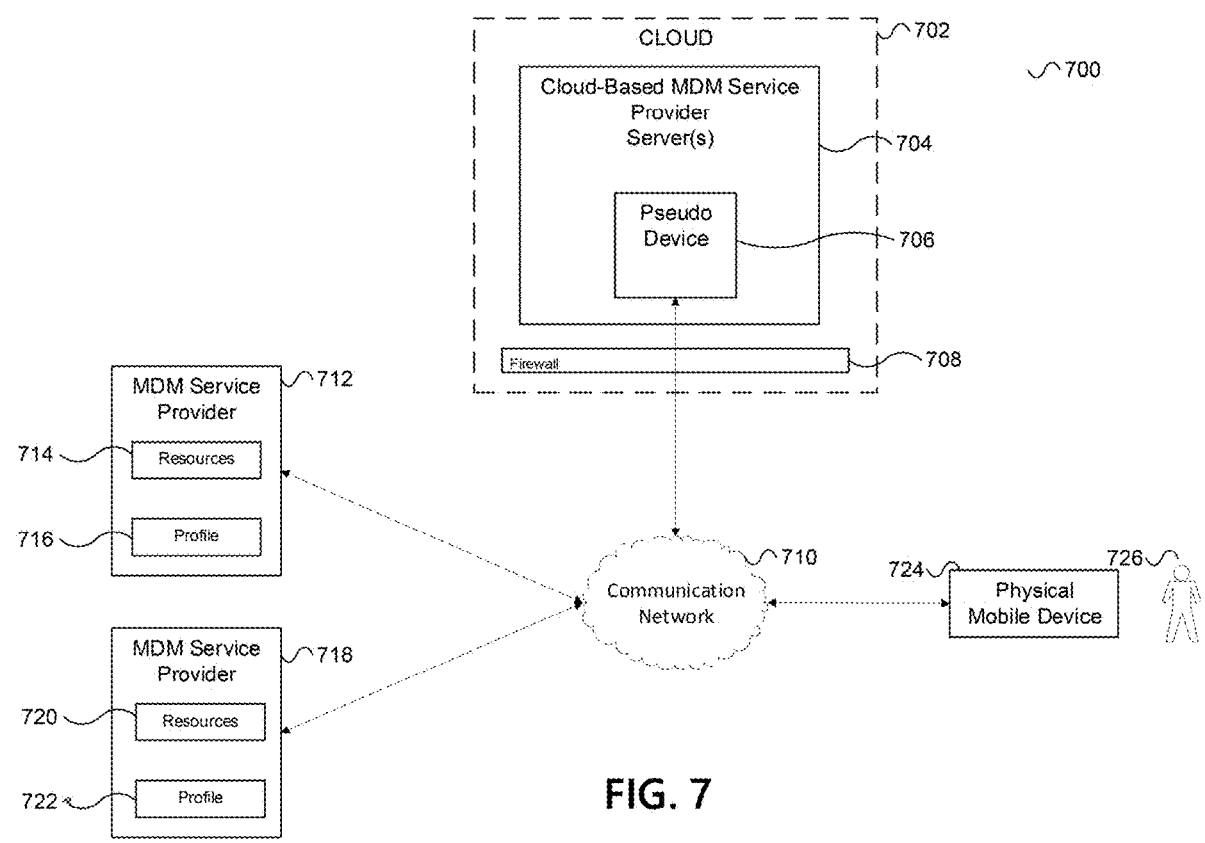
FIG. 7 depicts another illustrative enterprise mobility management system that may be used in accordance with one or more illustrative aspects described herein.

FIG. 7 is another illustrative enterprise mobility management system 700. Some of the components of the mobility management system 500 and mobility management system 600 described above with reference to FIGS. 5 and 6 have been omitted for the sake of simplicity. The architecture of the system 700 depicted in FIG. 7 is similar in many respects to the architecture of the system 500 and the system 600 described above with reference to FIGS. 5 and 6 and may include additional features not mentioned above.

In this instance, the enterprise mobility management system 700 may include a cloud computing environment 702 which interacts through a communication network 710 with one or more of mobile device management (MDM) service providers 712, 718 and a physical mobile device 724 (e.g., a physical end user device) of an end user 726. The communication network 710 may enable two or more computing devices to communicate using wireless LAN (WLAN) interfaces and/or signals, cellular interfaces and/or signals, Bluetooth interfaces and/or signals, and/or any other communication interfaces and/or signals.

The cloud computing environment 702 may include one or more cloud-based mobile device management service provider servers 704. The servers 704 may be computers, thin-clients, server blades, and/or other computing devices. At least one of the cloud-based mobile device management service provider servers 704 may include a pseudo device 706 representative of the physical mobile device 724 of the end user 726. The cloud computing environment may also include a firewall 708 or gateway to facilitate secure communication with and selective access to the pseudo device 706 by either of the physical mobile device 724 and one or more of the MDM service providers 712, 718. In some embodiments, the cloud computing environment 702 may be part of one of the MDM service providers 712, 718. In some embodiments, one of the MDM service providers 712, 718 may provide an enterprise premise deployment to control a transition of the physical mobile device 726 between one or more MDM service providers 712, 718. For example, the MDM service providers 712, 718 may transfer registrations to a local server that could then work with their existing provider and a new supplier with preference over which profile is active while policies are transferred (or do this up front to insulate against future supplier changes).

According to one or more aspects, the pseudo device 706 may represent the physical mobile device 724 of end user 726. Particularly, the pseudo device 706 may act as a proxy for the physical mobile device 724 (also referred to herein as a physical end user device). Additionally or alternatively, the pseudo device 706 may be a logical representation of the physical mobile device 724. As such, the pseudo device may utilize a processor and memory of the server 704 to perform tasks and store information, respectively. In some embodiments, the pseudo device 706 may include a computer program that implements protocols required to interact with MDM service providers 712, 718. Additionally or alternatively, in some embodiments, the pseudo device 706 may act similar to the physical mobile device 724 except that the pseudo device may enroll with multiple MDM service providers. Additionally or alternatively, in some embodiments, the pseudo device 706 may emulate and/or impersonate the physical mobile device 724 such that the pseudo device 706 may appear to the MDM service providers 712, 718 as the actual physical mobile device 724. For instance, in emulating and/or impersonating the physical mobile device 724, the pseudo device 706 may authenticate with, receive one or more commands and/or other communications from, and/or send one or more messages and/or other communications to the MDM service providers 712 and 718 on behalf of the physical mobile device 724 as if the pseudo device 706 were the physical mobile device 724. As a result, the MDM service providers 712, 718 may treat or otherwise interact with the pseudo device 706 as though they are interacting with the actual physical mobile device 724. Accordingly, the features and/or components discussed above with reference to FIGS. 5 and 6 in connection with a mobile device may be implemented with the pseudo device 706.

For instance, the pseudo device 706 may enroll with the first MDM service provider 712 in the same manner in which a typical physical mobile device would enroll with the first MDM service provider 712 (e.g., by authenticating with the first MDM service provider 712, by requesting one or more policies and/or profiles from the first MDM service provider 712, etc.). In this manner, the pseudo device 706 may be provisioned for use with the first MDM service provider 712 (e.g., similar to how a conventional physical mobile device may be provisioned for use with an MDM service provider). For example, in enrolling with the MDM service provider 712, the pseudo device 706 may send an enrollment request to the first MDM service provider 712. Subsequently, the pseudo device 706 may receive a policy-enforcement profile 716 (e.g., a certificate) of the first MDM service provider 712 from the first MDM service provider 712. The pseudo device 706 then may store the policy-enforcement profile 716 of the first MDM service provider 712 in an associated memory of the server(s) 704.

The policy-enforcement profile 716 may facilitate identification of and secure communication between the pseudo device 706 and the first MDM service provider 712. Once the pseudo device 706 is provisioned for use with the first MDM service provider 712, the pseudo device 706 may access and/or otherwise interact with various enterprise resources 714 of the first MDM service provider 712. The pseudo device 706 may be configured to receive one or more commands from the one or more MDM service providers 712, 718 on behalf of the physical mobile device 724, thereby enabling the MDM service providers 712, 718 to manage the physical mobile device 724 via the pseudo device 706.

Similarly, the pseudo device 706 may enroll with the second MDM service provider 718 in the same manner in which a typical physical mobile device would enroll with the second MDM service provider 718. Particularly, the pseudo device 706 may be provisioned for use with the second MDM service provider 718. More particularly, the pseudo device 706 may send an enrollment request to the second MDM service provider 718. Subsequently, the pseudo device may receive a policy-enforcement profile 722 (e.g., a certificate) of the second MDM service provider 718 from the second MDM service provider 718. The pseudo device 706 may store the policy-enforcement profile 722 of the second MDM service provider 718 in the associated memory of the server(s) 704. The policy-enforcement profile 716 of the first MDM service provider 712 and the policy-enforcement profile 722 of the second MDM service provider 718 may be stored concurrently at the pseudo device 706 in the associated memory of the server(s) 704.

The policy-enforcement profile 722 may facilitate identification of and secure communication between the pseudo device 706 and the second MDM service provider 718. Once the pseudo device 706 is provisioned for use with the second MDM service provider 718, the pseudo device 706 may access and/or otherwise interact with various enterprise resources 720 of the second MDM service provider 718. The pseudo device 706 may be configured to receive one or more commands from the one or more MDM service providers 712, 718 on behalf of the physical mobile device 724 to manage the physical mobile device 724.

As noted above, the pseudo device 706 may communicate with the physical mobile device 724 of the end user 726. Once the pseudo device 706 is provisioned for use with the first MDM service provider 712, the pseudo device 706 may deploy (e.g., send) the policy-enforcement profile 716 from the pseudo device 706 to the physical mobile device 724. The policy-enforcement profile 716 may facilitate enforcement of policies of the first MDM service provider 712 at the physical mobile device 724 (e.g., by an MDM policy enforcement agent such as an MDM cloud agent that may be running on the physical mobile device 724 and that may be configured to receive and subsequently enforce such policies).

Because the physical mobile device 724 is permitted to work with the first and second MDM service providers 712, 718 via the pseudo device 706, the physical mobile device 724 does not need to un-enroll and/or re-enroll when the physical mobile device 724 moves from working with e.g., the first MDM service provider 712 to working with the second MDM service provider 718. For example, the physical mobile device 724 does not need to uninstall a profile of the first MDM service provider 712 and re-enroll a profile of the second MDM service provider to access enterprise resources of the second MDM service provider 718. Additionally, the user does not need to have more than one physical mobile device to use with each of the MDM service providers 712, 718.

In communicating with the physical mobile device 724, the pseudo device 706 may deploy and/or enable access to enterprise resources 714 including, for example, enterprise applications, application data, and/or other information as may be permitted by the policy-enforcement profile 716 of the first MDM service provider 712. The pseudo device 706 may also send commands to the physical mobile device 724 in communicating with the physical mobile device 724. In some instances, the pseudo device 706 may independently send commands to the physical mobile device 724 without being prompted by the first MDM service provider 712 and/or without receiving any commands from the first MDM service provider 712. In other instances, the pseudo device 706 may send commands to the physical mobile device 724 in response to receiving one or more commands from the first MDM service provider 712. The commands sent from the pseudo device 706 to the physical mobile device 724 may, in some instances, be one or more different commands from the commands the pseudo device 706 received from the first MDM service provider 712. For example, the pseudo device 706 may, in some instances, modify that commands received from an MDM service provider and subsequently send the modified commands to the physical mobile device 724. The one or more different and/or modified commands may be based at least in part on the commands received at the pseudo device 706 from the first MDM service provider 712. The pseudo device 706 may generate the one or more different and/or modified commands and may send those commands to the physical mobile device 724. Additionally or alternatively, the pseudo device 706 may receive commands from the first MDM service provider 712 and send the received commands to the physical mobile device 724.

The pseudo device 706 may send the commands to the physical mobile device 724 to enforce policies associated with the first MDM service provider 712. For example, the commands may cause one or more previously deployed enterprise resources 714 (which may, e.g., include one or more enterprise applications, application data, data or other information permitted by the policy-enforcement profile 716) to be retracted from the physical mobile device 724. This may be referred to as "retraction" in the discussion below. In causing one or more previously deployed enterprise resources 714 to be retracted from the physical mobile device 724, the commands may cause data generated by the physical mobile device 724 in connection with the first MDM service provider 712 to be removed from the physical mobile device 724. In some instances, retracting enterprise resources and/or other information from the pseudo device 706 may include retracting the policy-enforcement profile 716.

The physical mobile device 724, in performing a retraction command received from the pseudo device 706, may send to the pseudo device 706 the one or more of the enterprise resources 714, the data generated at the physical mobile device 724, and/or the policy-enforcement profile 716. Subsequently, the physical mobile device 724 may perform a selective wipe to remove/delete one or more of the enterprise resources 714, the data generated by the physical mobile device 724, and/or the policy-enforcement profile 716 from the physical mobile device 724. In these instances, personal applications and personal data (e.g., data not associated with the MDM service providers 712, 718) is maintained by the physical mobile device 724 during the selective wipe of the physical mobile device 724. In other words, personal application and personal data stored on the physical mobile device 724 might not be removed during retraction and/or deleted during a selective wipe.

In some embodiments, the pseudo device 706 may send to the physical mobile device 724 one or more commands that may cause the physical mobile device 724 to locally partition and/or otherwise divide and arrange the one or more of the enterprise resources 714, the data generated at the physical mobile device 724, and/or the policy-enforcement profile 716 such that the end user 726 cannot access (e.g., is blocked from accessing) the one or more of the enterprise resources 714, the data generated at the physical mobile device 724, and/or the policy-enforcement profile 716.

In some embodiments, the pseudo device 706 may respond to commands from either the first MDM service provider 712 and/or the second MDM service provider 718 directly (e.g., without the involvement of the physical mobile device 724). Specifically, the pseudo device 706 may receive one or more commands from one or more MDM service providers 712, 718. The pseudo device 706 may determine whether to send a command from the pseudo device 706 to the physical mobile device 724. The determination may be made based on several factors including, for example, whether unknown information is needed from the physical mobile device 724 to respond to the one or more commands sent from one or more MDM service providers 712, 718; whether a policy associated with the one or more commands received from one or more MDM service providers 712, 718 conflicts with another policy of one or more of the MDM service providers 712, 718 with which the pseudo device 706 is currently enrolled; and/or one or more other factors. In response to a determination not to send one or more commands to the physical mobile device 724, the pseudo device 706 may send a response to the one or more commands received from the one or more MDM service providers 712, 718 to the one or more MDM service providers 712, 718. For example, the response may be sent to the first MDM service provider 712, if the intended or desired results of the one or more commands received from the first MDM service provider 712 has already been achieved, without sending any command to the physical mobile device 724. The response may include an indication that an operation associated with the one or more commands received from the one or more MDM service providers 712, 718 was completed. In some instances, the response may include an indication that the operation was not completed, or some other indication.

In some embodiments, the physical mobile device 724 might not communicate with one or more of the MDM service providers 712, 718 without the involvement of the pseudo device 706 representing that physical mobile device 724. In other embodiments, the physical mobile device 724 may communicate with one or more of the MDM service providers 712, 718 with or without the involvement of the pseudo device 706 representing that physical mobile device 724.

In some embodiments, a user 726 of the physical mobile device 724 may register and/or sign-up for a cloud service associated with the cloud computing environment 702 and install a profile certificate for the cloud service on the physical mobile device 724. When the user 726 wishes to use the first MDM service of the first MDM service provider 712, the pseudo device 706 may be established within the cloud computing environment 702 and provisioned for use with the first MDM service provider 712 as discussed herein. Similarly, when the user 726 wishes to use the second MDM service of the second MDM service provider 718, the pseudo device 706 may be provisioned for use with the second MDM service provider 718 as discussed herein. The pseudo device 706 may receive messages from other MDM service providers and queue such messages or potentially answer such messages (e.g., by sending an answer back to the respective MDM service provider). In an instance where the pseudo device 706 responded to the first MDM service provider 712 without involvement of the physical mobile device 724 (e.g., a blocked message), the pseudo devices 706 may send an indication of the messages to the physical mobile device 724 and, in response, the physical mobile device 724 may inform the user 726 of any blocked messages. The physical mobile device 724 may receive user input instructing the physical mobile device 724 to display the messages. The physical mobile device 724 may then transmit the instruction to the pseudo device 706 and, in response, may receive the messages for display.

In some embodiments, the user 726 and the cloud service associated with the cloud computing environment 702 may enter into a contract. The user may specify at the physical mobile device 724 what actions the cloud service is permitted to perform on the physical mobile device 724. The physical mobile device 724 may transmit these specifications to the cloud computing environment 702. For example, the user 726 may specify that the cloud service should not attempt to perform any actions to the native gallery of the physical mobile device 724. The cloud service (and/or the pseudo device 706) may account for the contract specifications indicated in the contract before the cloud service (and/or the pseudo device 706) dispatches any messages on behalf e.g., the first MDM service provider 712 to the physical mobile device 724. For example, the pseudo device may operate in accordance with the contract specifications.

While only a first MDM service provider 712 and a second MDM service provider 718 are shown in FIG. 7 and discussed above, there may be more than two mobile device management service providers. The pseudo device 706 may interact with and/or otherwise perform the same functions described above with respect to any additional MDM service providers.

While the examples discussed above involve a single physical mobile device 724 being provisioned with several MDM service providers 712, 718 via a pseudo device 706, arrangements in which another (e.g., second) physical mobile device (not shown) is provided are contemplated. In these arrangements, a second pseudo device may be established in the cloud computing environment 702. The second pseudo device may represent the second physical mobile device. The second pseudo device may be provisioned for use with one or more MDM service providers 712, 718. The second pseudo device may perform similar functions as the pseudo device discussed above except that such operations will be in relation to the second physical mobile device rather than the physical mobile device described above. Additional physical mobile devices and corresponding pseudo devices may similarly be provided in other arrangements.

Figure 8:
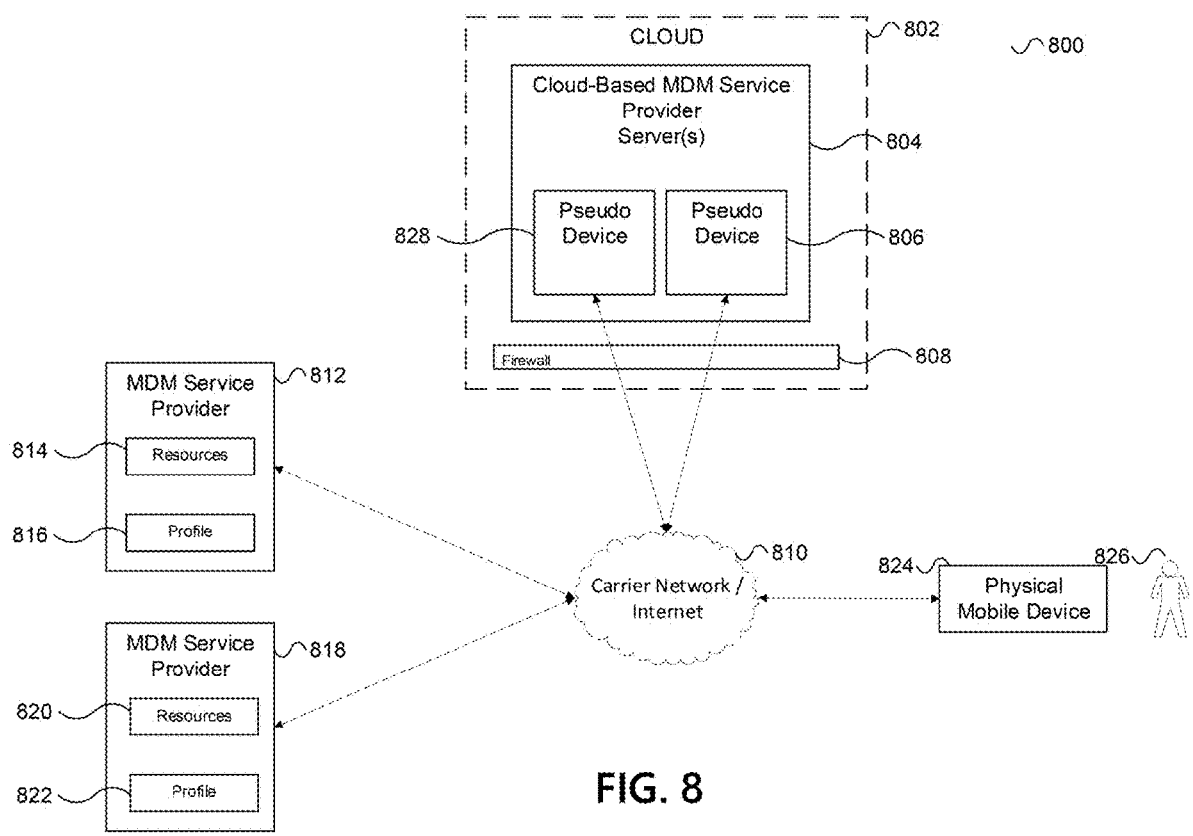
FIG. 8 depicts another illustrative enterprise mobility management system that may be used in accordance with one or more illustrative aspects described herein.

FIG. 8 is another illustrative enterprise mobility management system 800. Some of the components of the mobility management system 500 and mobility management system 600 described above with reference to FIGS. 5 and 6 have been omitted for the sake of simplicity. The architecture of the system 800 depicted in FIG. 8 is similar in many respects to the architecture of the system 500 and the system 600 described above with reference to FIGS. 5 and 6 and may include additional features not mentioned above.

Additionally, the architecture of system 800 is similar in many respects to the architecture of the system 700 and may include additional features not mentioned above. In particular, in the arrangement illustrated in FIG. 8, the enterprise mobility management system 800 may include a cloud computing environment 802 which interacts through a communication network 810 with one or more MDM service providers 812, 818 and a physical mobile device 824 (e.g., a physical end user device) of an end user 826. The communication network 810 may enable two or more computing devices to communication using WLAN interfaces and/or signals, cellular interfaces and/or signals, Bluetooth interfaces and/or signals, and/or any other communication interfaces and/or signals.

The cloud computing environment 802 may include one or more cloud-based mobile device management service provider servers 804. The servers 804 may be computers, thin-clients, server blades, and/or other computing devices. At least one of the cloud-based mobile device management service provider servers 804 may include multiple pseudo devices 806, 828 representative of the physical mobile device 824 of the end user 826. The cloud computing environment 802 may also include a firewall 808 or gateway to facilitate secure communication with and selective access to the pseudo devices 806, 828 by of either the physical mobile device 824 and one or more of the MDM service providers 812, 818.

As noted above, within the servers 804, multiple pseudo devices 806, 828 may be established within the cloud computing environment 802. Each of the pseudo devices 806, 828 may represent the physical mobile device 824. Each of the pseudo devices 806, 828 representing the physical mobile device 824 may provisioned for use with an MDM service provider of the MDM service providers 812, 818. For example, the first pseudo device 806 may be provisioned for use with a first MDM service provider 812. The second pseudo device 828 may be provisioned for use with a second MDM service provider 818. The first and second pseudo devices 806, 828 may each include a computer program that implements protocols required to interact with their respective MDM service provider 812, 818.

Particularly, the first pseudo device 806 and the first MDM service provider 812 may communicate with each other to provision the first pseudo device 806 for use with the first MDM service provider 812. The first pseudo device 806 may initiate the provisioning by sending, from the first pseudo device 806, a first enrollment request to the first MDM service provider 812. In response, the first pseudo device 806 may receive a first policy-enforcement profile 816 from the first MDM service provider 806 and may store, at the first pseudo device 806, the first policy-enforcement profile 816 in memory associated with the first pseudo device 806. The provisioning of the second pseudo device 828 for use with second MDM service provider 818 may include: sending, from the second pseudo device 828, a second enrollment request to the second MDM service provider 818; receiving, at the second pseudo device 828, a second policy-enforcement profile 822 from the second MDM service provider 818. The second policy-enforcement profile 822 may be different from the first policy-enforcement profile 816. The second pseudo device 818 may store the second policy-enforcement profile 822 in memory associated with the second pseudo device 818.

Once the first pseudo device 806 is provisioned, the first pseudo device 806 may be configured to receive one or more commands from the first MDM service provider 812 on behalf of the physical mobile device 824. Similarly, once the second pseudo device 828 is provisioned, the second pseudo device 828 may be configured to receive one or more commands from the second MDM service provider 818 on behalf of the physical mobile device 824.

Accordingly, the first pseudo device 806 may receive a first command from the first MDM service provider 812. In response, the first pseudo device 806 may send a second command to the physical mobile device 824. Similarly, the second pseudo device may receive commands and send commands in the same manner with respect to the second MDM service provider 818.

Once the first pseudo device 806 receives the first command from the first MDM service provider 812, the first pseudo device 806 may determine whether to send a second command to the physical mobile device 824. The determination can be based on one or more factors. For example, the determination may be based on whether the first pseudo device 806 has sufficient information to respond to the first command. In response to a determination to send a second command to the physical mobile device 824, the first pseudo device 806 may send the second command to the physical mobile device 824. In response to a determination not to send the second command to the physical mobile device 824, the first pseudo device 806 may send a response to the first command to the first MDM service provider 812. This response may be sent without any involvement from the physical mobile device 824. For example, the response may be sent without sending a command to and receiving a response from the physical mobile device 824. The response sent to the first MDM service provider 812 may include an indication that an operation associated with the first command was completed. For example, the indication may indicate that a selective wipe was performed at the physical mobile device 824.

The first pseudo device 806 may receive enterprises resources (e.g., resource data 814) from the first MDM service provider 812. The first pseudo device 806 may receive the resource data 814 during a time period in which a policy-enforcement profile 822 of the second MDM service provider 818 is currently active at (e.g., in use by) the physical mobile device 824 or when no policy-enforcement profile is currently active at (e.g., in use by) the physical mobile device 824. In such instances, the first pseudo device 806 may cache or otherwise store the resource data 814 until the policy-enforcement profile 816 of the first MDM service provider 812 becomes active at the physical mobile device 824. The first pseudo device 812 may then push the resource data 814 from the first pseudo device 812 to the physical mobile device when the policy-enforcement profile 816 is currently active on the physical mobile device 824. As a result, the physical mobile device 824 now has access to and/or can otherwise interact with the resource data 814. Second pseudo device 828 may likewise perform in a similar manner. For example, the second pseudo device 828 may receive and cache resource data 820 from the second MDM service provider 818 when the policy-enforcement profile 816 is currently active at the physical mobile device 824. The second pseudo device 828 may then push the resource data 820 to the physical mobile device 824 when the policy-enforcement profile 822 is currently active at the physical mobile device 824.

In some embodiments, the first pseudo device 806 may receive a first command from the first MDM service provider 812. The first pseudo device 806 may then modify the command prior to sending the command to the physical mobile device 824. The first pseudo device 806 may modify the command based device state information stored at the first pseudo device 806. The first command may be received during a time period in which the policy-enforcement profile 822 of the second MDM service provider 818 is active on the physical mobile device 824.

In some embodiments, the first pseudo device 806 may send a selective wipe command to the physical mobile device 824. The selective wipe command may be configured to cause a subset of applications associated with the first MDM service provider 812 and data associated with the subset of applications to be deleted. The selective wipe command may be further configured to cause personal applications and data associated with the personal applications, as well as the policy-enforcement profile 816 associated with the first MDM service provider 812, to be maintained. For example, the selective wipe command may cause the physical mobile device 824 to delete any data associated with the first MDM service provider 812 at the physical mobile device 824 while not deleting any personal data and/or data independent of the first MDM service provider 812.

In some embodiments, an MDM cloud agent may be installed on physical mobile device 824. The MDM agent may be configured to monitor device state information of the physical mobile device and determine changes in such device state information. The MDM agent may be configured to enforce policies of the MDM service providers 812, 818 and/or report changes in the device state information to the first or second pseudo device 806, 828, respectively.

In some embodiments, the first pseudo device 806 may receive a request from the physical mobile device 824 initiated based on one of user input or an indication that the physical mobile device 806 is within a first geographic fence of the first MDM service provider 812. In response, the first pseudo device 806 may deploy (e.g., send enterprises resources such as resource data, application data, applications, and/or policy enforcement profile 816) from the first pseudo device 806 to the physical mobile device 824. In response to receiving another request initiated based on one of another user input or an indication that the physical mobile device 824 is no longer within the first geographic fence, the first pseudo device 806 may retract, from the physical mobile device 806, policy enforcement profile 816 of the first MDM service provider 812, and/or resources data 814 such as, for example, applications, application data, and/or other data of the first MDM service provider 812.

In response to receiving a new request at the second pseudo device 828 from the physical mobile device 824 initiated based on one of a new user input or an indication that the physical mobile device 824 is within a second geographic fence of the second MDM service provider 818, the second pseudo device 828 may deploy to the physical mobile device 824 the second policy-enforcement profile 822 of the second MDM service provider 818, applications, application data, and/or other data of the second MDM service provider 818.

In some embodiments, the first pseudo device 806 may identify a conflict between policies of the first MDM service provider 812 and policies of the second MDM service provider 818. The first pseudo device 806 may resolve the conflict by applying a solution determined from a knowledge-based system of the cloud computing environment 802. The first pseudo device 806 may resolve the conflict by sending a warning to the physical mobile device 824. For example, the warning may include one or more user-selectable commands to resolve the conflict. Additionally or alternatively, the first pseudo device 806 may resolve the conflict by sending a mini-wipe command to the physical mobile device 824. Additionally or alternatively, the mini-wipe command may be configured to cause at least a subset of data causing the conflict to be deleted.

The second pseudo device 828 may perform similar functions as the first pseudo device 806 with respect to the second MDM service provider 818 and the physical mobile device 824. Furthermore, the first pseudo device 806 and/or the second pseudo device 828 may perform any functions associated with other pseudo devices described herein. As a result, the first pseudo device 806 and/or the second pseudo device 828 may perform one or more of the functions discussed below with respect to FIGS. 9-16. Although the functions of FIGS. 9-16 are written from the enterprise mobility management system 700 perspective, such functions also apply to system 800. When applying the functions of FIGS. 9-16 to system 800, please note that rather than having a pseudo device provisioned for use with the first and second MDM service providers, a first pseudo device is provisioned for use with the first MDM service provider and a second pseudo device is provisioned for use with the second MDM service provider.

In some embodiments, a third pseudo device and a fourth pseudo device may be established in the cloud computing environment 802. The third pseudo device and the fourth pseudo device may each represent a second physical mobile device. The third pseudo device may be provisioned for use with the first MDM service provider 812 and the fourth pseudo device may be provisioned for use with the second MDM service provider 818. Theses pseudo device can perform any functions associated with other pseudo devices described herein.

Mobile Device Management Features

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing mobile device management functionalities. In the description below, various examples illustrating how mobile device management functionalities may be provided in accordance with one or more embodiments will be discussed.

Figure 9:
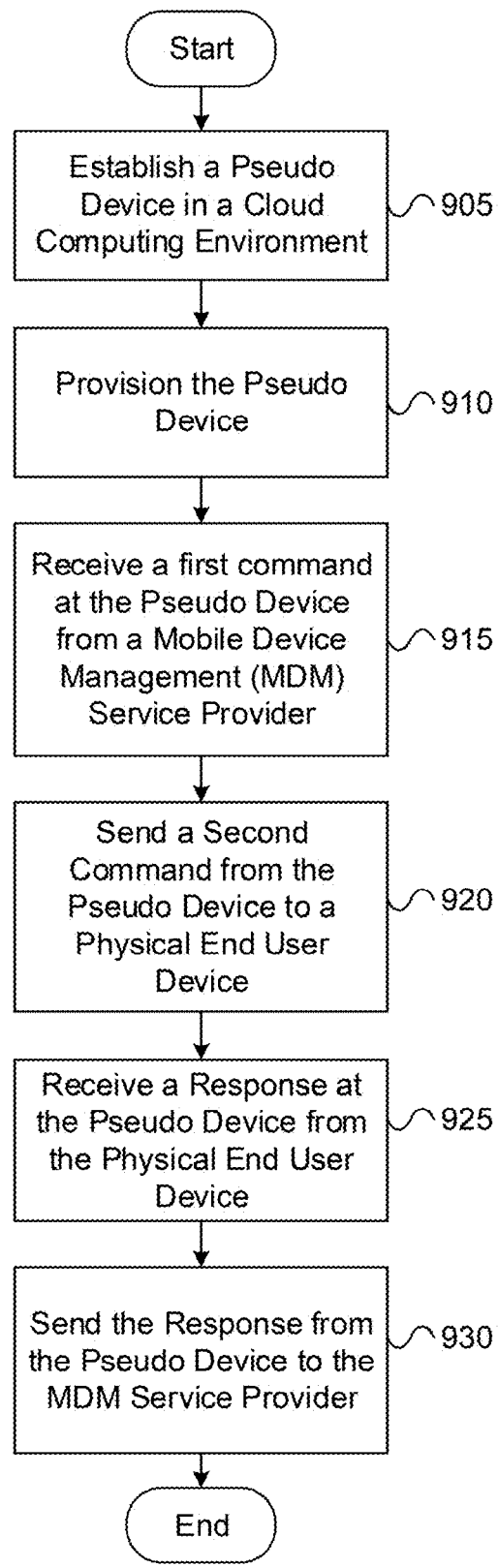
FIG. 9 depicts a flowchart that illustrates a method of applying one or more mobile device management policies to a physical end user device via a pseudo device in accordance with one or more illustrative aspects discussed herein.

FIG. 9 depicts a flowchart that illustrates a method of applying one or more mobile device management policies to a physical end user device via a pseudo device in accordance with one or more illustrative aspects discussed herein. In one or more embodiments, the method of FIG. 9 and/or one or more steps thereof may be performed by a computing device (e.g., generic computing device 201). In other embodiments, the method illustrated in FIG. 9 and/or one or more steps thereof may be embodied in computer-executable instructions that are stored in a computer-readable medium, such as a non-transitory computer-readable memory.

As seen in FIG. 9, the method may begin at step 905 in which a pseudo device is established in a cloud computing environment. For example, in step 905, a cloud computing environment (e.g., one or more servers, blade servers, thin-clients, computers, tablet computers, laptop computers, or other type of computing device) may establish a pseudo device within a server of the cloud representative of a physical end user device (e.g., a mobile computing device, such as a laptop computer, tablet computer, smart phone, or other type of physical mobile device).

The pseudo device representative of the physical end user device may send the associated physical end user device an MDM cloud agent to be installed thereon. In one or more arrangements, the MDM cloud agent may be an application, service, or process that is configured to run on the physical end user device and is further configured to collect and/or otherwise obtain information about device, including information about the current state of the physical end user device. For example, the MDM cloud agent may be configured to collect and/or maintain device-level state information, such as state information that is indicative of the operating systems and/or applications that are stored on and/or running on the physical end user device, state information that is indicative of the network connections that are available to and/or being used by the physical end user device, and/or state information that is indicative of the current location of where the device is located and/or being used (e.g., in terms of geographic coordinates; in terms of semantic labels, such as "home," "work," "client site;" etc.). While these types of state information are listed here as examples of the types of device-level state information that may be collected and/or maintained by the MDM cloud agent in some instances, additional and/or alternative types of state information may be similarly collected and/or maintained by the MDM cloud agent in other instances.

In addition to collecting and maintaining various types of state information, the MDM cloud agent running on the physical end user device may be further configured to evaluate, analyze, and/or otherwise monitor the various types of state information being collected. For example, the MDM cloud agent may be configured to periodically determine whether state information of the physical end user device has changed and/or execute one or more actions based on detected changes in the state information. For example, the state information of the physical end user device (also referred to herein as device-level state information) may include information about what applications are installed and/or running on the physical end user device, where the physical end user device is located, what networks the physical end user device is connected to, and/or other device-level considerations. In some instances, the MDM cloud agent may provide the state information to one or more other applications, services, and/or processes. For instance, in some examples discussed below, the MDM cloud agent and/or one or more other applications, services, and/or processes on the physical end user device may analyze and/or otherwise process the state information collected by the MDM agent in enforcing mobile device management policies and/or performing other actions in connection with mobile device management policies. For instance, some mobile device management policies may define permitted and/or prohibited functions and/or applications based on different sets of circumstances that may be evaluated using the device state information collected by the MDM agent. In these and/or other ways, the state information may be used in enforcing behavior limitations on various functions and/or applications.

In some embodiments, the physical end user device and/or the MDM cloud agent running on the physical end user device may provide information to, and/or may receive one or more commands from, the pseudo device established within one or more policy management servers of the cloud computing environment (which may, e.g., impact the state of the device). For example, in providing information to the pseudo device logically partitioned within one or more policy management servers of the cloud computing environment, the physical end user device and/or the MDM cloud agent running on the physical end user device may send state information (which may, e.g., include various types of device state information as discussed herein) to the pseudo device, which may, for instance, be configured to analyze such information and provide commands and/or other information back to the physical end user device and/or the MDM cloud agent running on the physical end user device. In addition, in receiving commands from the pseudo device of the cloud computing environment, the physical end user device and/or the MDM cloud agent running on the physical end user device may receive new and/or updated policies and/or other policy information, remotely analyzed and/or otherwise processed physical end user device state information (e.g., the pseudo device may remotely analyze and/or otherwise process state information collected by, obtained from, and/or related to the physical end user device, and then provide such analyzed and/or processed state information back to the physical end user device), and/or other information.

The pseudo device representative of the physical end user device may be established within one or more policy management servers of the cloud computing environment. The pseudo device may receive an MDM agent associated with an MDM service provider provided during provisioning of the pseudo device for use with that MDM service provider. As a result, the pseudo device may maintain multiple MDM agents in memory associated with the pseudo device. The pseudo device may communicate with the MDM cloud agent running on the physical end user device such that the MDM cloud agent may perform functions of one or more different MDM agents at the physical end user device. The MDM cloud agent may perform the functions of the one or more MDM agents while appearing as a single MDM cloud agent on the physical end user device. For example, the MDM cloud agent running on the physical end user device may exchange data with and/or receive commands from different MDM agents stored at the pseudo device. Accordingly, the MDM cloud agent may implement the functionality of the one or more MDM agents at the physical end user device without having to modify the physical end user device to include each MDM agent received from the MDM service providers.

In step 910, the pseudo device may be provisioned for use with one or more MDM service providers. For example, in step 910, the pseudo device may send or provide an enrollment request to each MDM service provider and, in response, may receive a policy-enforcement profile from each MDM service provider that grants access to their respective enterprise resources. For example, an enterprise may require some or all of its employees and/or other users to install a policy-enforcement profile on their respective mobile devices in a bring-your-own-device (BYOD) scheme to reduce enterprise security risks, and the policy-enforcement profile(s) that may be received by the pseudo device in step 910 may be defined by and/or otherwise associated with such an enterprise. Additionally or alternatively, the policy-enforcement profile may be stored in memory associated with the pseudo device when not in use by the physical end user device. Further, the memory associated with the pseudo device may store concurrently a policy-enforcement profile from each MDM service provider with which the pseudo device is provisioned. Because the pseudo device is established within one or more policy management servers of the cloud computing environment, the pseudo device is not limited by any physical constraints of the physical end user device regarding concurrent storage of multiple policy-enforcement profiles and/or other information, such as, for example, applications, application data, etc. For example, the pseudo device may store a policy-enforcement profile of a first MDM service provider, its associated applications and/or application data in addition to storing a policy-enforcement profile of a second MDM service provider, its associated applications and/or application data. In such an example, the physical end user device may have insufficient storage and/or processing ability to maintain and store concurrently the policy-enforcement profile of a first MDM service provider, its associated applications and/or application data in addition to the policy-enforcement profile of a second MDM service provider, its associated applications and/or application data. Additionally or alternatively, the physical end user device might not be able to concurrently store two profiles because each profile might have rules that require the respective profile to exclusively be the only profile installed on, stored on, or otherwise maintained on the physical end user device. Additionally or alternatively, the physical end user device might not be able to concurrently enroll with two MDM service providers because the operating system of the physical end user device may only support a single profile.

In step 915, once the pseudo device is provisioned for use with the one or more MDM service providers, the pseudo device may be configured to receive one or more commands from the one or more MDM service providers on behalf of the physical end user device. For example, in step 915, the pseudo device may receive a first command from a first MDM service provider and/or from an entity on behalf of the first MDM service provider. The first MDM service provider and/or the entity on behalf of the first MDM service provider may generate on its own accord the first command (e.g., without a triggering event based on data received from the pseudo device) and push the first command to the pseudo device. Additionally or alternatively, first MDM service provider or the entity may generate the first command in response to a change in device state information of the physical end user device received (e.g., a pull) from the pseudo device and/or from the physical end user device. The change in device state information may include, for example, an indication of a change in the applications present at the physical end user device, an indication of a change in network connections, an indication of a change in the location of the physical end user device, and/or any other change at the physical end user device. For example, the indication of a change in the applications present at the physical end user device may include a listing of applications present at the physical end user device and may include associated status information about each of the applications listed. For example, the status may include whether the application is installed, in current operation, open, whether the application is being executed locally or remotely, and/or other information.

In some instances, the first command may be configured as though the first command is being sent to the physical end user device. For example, when the pseudo device is impersonating the physical end user device, the MDM service provider might not be aware that the first command is being sent to the pseudo device rather than to the physical end user device. In such instances, the first command may be configured to manage the physical end user device in accordance with policies of the first MDM service provider.

The first command may include management information such as one or more policy updates to be applied by the MDM cloud agent. The first command may be configured to be specific to a particular user of the physical end user device and/or specific to a role of any person using the physical end user device (e.g., policies may be applied to users having a particular role or position such as sales, accounting, consulting, legal, etc.).

In some embodiments, the first command may be a query requesting the current state information of the physical end user device. In such cases, the MDM service provider may receive the device state information of the physical end user device from the pseudo device. In some instances, the pseudo device may have transmitted the query to the physical end user device and received the device state information from the physical end user device. Additionally or alternatively, the pseudo device might not send the query to the physical end user device and instead may send the device state information stored in the memory associated with the pseudo device to the first MDM service provider.

In some embodiments, the first command may be configured to cause the MDM cloud agent and/or the physical end user device to enforce one or more behavior limitations at the physical end user device. Some policies and/or behavior limitations may result in the first command being configured to perform a retraction of resources and/or a selective wipe. For example, the first command may be a command to retract one or more of the policy-enforcement profile of the first MDM service provider, applications associated with the first MDM service provider, data associated with such applications, enterprise resources of the of the first MDM service provider, data generated at the physical end user device that is associated with the first MDM service provider, and/or other information. In some instances, the first command may be a selective wipe command configured to delete one or more of the policy-enforcement profile of the first MDM service provider, applications associated with the first MDM service provider, data associated with such applications, enterprise resources of the of the first MDM service provider, data generated at the physical end user device that is associated with the first MDM service provider, and/or other information. In some embodiments, the selective wipe command maintains (e.g., does not delete) the policy-enforcement profile of the first MDM service provider, personal applications, and personal data.

In some embodiments, the first command, in accordance with one or more policies, may be configured to grant the pseudo device and/or the physical end user device access to some enterprise resources and/or services while restricting and/or preventing access to other enterprise resources and/or services. In other embodiments, the first command may be configured to prevent the physical end user device from sending enterprise resources or other data associated with the first MDM service provider from the physical end user device to another device. Additionally or alternatively, the first command may be configured to permit the physical end user device to send data enterprise resources or other data associated with the first MDM service provider to the pseudo device for later retrieval (e.g., when the physical end user device is within a geographic location of the first MDM service provider).

In some embodiments, the first command, in accordance with some policies, may be configured to prevent modification of enterprises resources that are accessed (e.g., read-only) by the pseudo device and/or the physical end user device. In addition, the first command may be configured to reconfigure software or data at the pseudo device and/or the physical end user device. Additionally, the first command may be configured to cause the MDM agent and/or the physical end user device to prevent an application from being opened or otherwise executed and may close the application if it is currently being executed (e.g., running) at the physical end user device.

In some embodiments, the first command may enforce some policies and/or behavior limitations by being configured to selectively enable and/or disable one or more functions of the physical end user device such as one or more functions of the operating system, applications, access to data or resources at the physical end user device locally and/or remotely accessible on one or more networks. Restricting access to one or more resources local to the physical end user device may include blocking, limiting, and/or otherwise controlling access to resources of the physical end user device such as, for example, camera functionality, text message functionality, Bluetooth functionality, local application functionality, and/or any other functionality of the physical end user device. Restricting access to one or more network resources may include blocking access to certain websites, enterprise resources that the physical end user device is not authorized to access, or any other remotely located resources.

Alternatively or additionally, in some embodiments, the first MDM service provider may be aware of the pseudo device. As a result, the first MDM service provider may configure the first command to instruct the pseudo device on how to manage the physical end user device. In such embodiments, the first command may be configured to manage the physical end user device and/or manage the pseudo device's management of the physical end user device in accordance with the policies of the first MDM service provider. Particularly, the first command may be configured to result in enforcement of policies at the physical end user device via the pseudo device. For example, the first command may be designed to have the same result as any of the different configurations of first commands discussed above.

In addition to receiving commands from the enterprise servers of the first MDM service provider, the pseudo device may receive new and/or updated policies and/or other policy information, remotely analyze and/or otherwise process device state information (e.g., the enterprise servers may remotely analyze and/or otherwise process state information collected by, obtained from, and/or related to the physical end user device, and then provide such analyzed and/or processed state information back to the physical end user device), and/or other information. In some embodiments, the pseudo device may forward the device state information received from the physical end user device to the first MDM service provider. In such embodiments, the first MDM service provider may analyze the device state information and relate the analysis to the pseudo device. The pseudo device may then provide such analyzed and/or processed device state information, other information and/or policies back to the physical end user device. Additionally or alternatively, the pseudo device may further process the analyzed device state information received from the first MDM service provider prior to providing such analyzed device state information to the physical end user device.

In some embodiments, the pseudo device may determine if the first command or a predicted resulting state of the physical end user device after the first command is implemented at the physical end user device would violate or otherwise create conflicts with any policy of an MDM service provider with which the pseudo device is enrolled. If there is no violation or conflict, the pseudo device may send a command to the physical end user device as described below. If there is a violation or conflict, the pseudo device may act in accordance with FIG. 16 discussed hereinafter.

In step 920, the pseudo device may send one or more commands from the pseudo device to the physical end user device. For example, in step 920, the pseudo device may send a second command from the pseudo device to the physical end user device. The pseudo device may generate the second command based on the first command received from the first MDM service provider and/or may otherwise be associated with the first MDM service provider. For example, the pseudo device may generate and send the second command to the physical end user device in response to receiving the first command. The second command may be configured to enforce a policy associated with the first command. The second command may be different from the first command received from the first MDM service provider. In some instances, the second command may be the same as the first command received from the first MDM service provider. In such embodiments, the second command need not be generated at the pseudo device and may be retransmitted using the received first command.

In some embodiments, the pseudo device may on its own accord generate the second command. For example, the pseudo device may generate the second command without the involvement of the first MDM service provider and without receiving the first command. As a result, the pseudo device can still manage and enforce policies of the first MDM service provider on its own. For example, the pseudo device may need to manage and enforce policies of the first MDM service provider if a connection with the first MDM service provider is lost.

The second command may be configured similar to any of the configurations of the first command discussed herein. For example, the second command may be configured to cause the MDM cloud agent and/or the physical end user device to perform a retraction, deployment, selective wipe, restrict access to enterprises resources, grant access to enterprises resources, restrict access to functionality, reconfigure functionality, prevent modification to enterprise resources, prevent transmission of enterprise resources from the physical end user device, or any other configuration of a command discussed herein.

Upon receiving the first and/or second command from the pseudo device, the MDM cloud agent and/or the physical end user device may execute the first and/or second command such that the policies associated with the command are satisfied. For example, the physical end user device may perform a selective wipe of data stored at the physical end user device. For example, the physical end user device may restrict access to functionality, prevent modification to enterprise resources, and/or otherwise implement any of the configurations dictated by the first and/or second commands. The execution of the commands at the physical end user device may impact the device state information of the physical end user device. As a result, device state information may be provided to the pseudo device.

In some embodiments, changes in the device state information may cause the MDM cloud agent and/or the physical end user device to perform management operations to enforce policies of the one or more MDM service providers. For example, based on a change in geographic location, the MDM cloud agent may restrict access to certain enterprise resources of the first MDM service provider.

The physical end user device may also, in accordance with policies enforced by e.g., the MDM cloud agent and commands, access enterprise resources of the one or more MDM service providers. For example, the physical end user device may access enterprise resources of the first MDM service provider provided to the pseudo device. Additionally or alternatively, the physical end user device may access enterprises resources directly from the first MDM service provider without involvement of the pseudo device. The physical end user device may store, edit, and/or otherwise interact with the enterprise resources in accordance with the policies of the first MDM service provider.

In some embodiments, the MDM cloud agent, the physical end user device, and/or the pseudo device may determine based on the device state information whether one or more policies of one or MDM service providers has been violated. In response to a determination that a policy has been violated, the physical end user device may take corrective action. The physical end user device may also send a report of the violation to the pseudo device. The pseudo device may then determine corrective action and send resulting commands to the physical end user device. In some embodiments, the pseudo device may send the report or a modified report to the MDM service provider whose policies were violated. In response to a determination that policy has not been violated, normal management operations continue.

In step 925, the pseudo device may receive a response to the second command from the physical end user device. For example, in step 925, the pseudo device may determine whether the response is sufficient to satisfy the first command received from the first MDM service provider. In response to a determination that the response is insufficient to satisfy the first command and/or second command (e.g., the desired resulting state of the physical end user device after applying the command has not been achieved), the pseudo device may send a command to the physical end user device configured to correct the state of the physical end user device such that a second response from the physical end user device may be sufficient to satisfy the first command and/or the second command (e.g., the desired resulting state of the physical end user device after applying the command has been achieved).

In some embodiments, the pseudo device may determine if the change in the state of the physical end user device conflicts with any other policy of any MDM service with which the pseudo device is enrolled. In response to a determination that the response conflicts with another policy, the pseudo device may act in accordance with FIG. 16 discussed hereinafter.

In step 930, in response to a determination that the response is sufficient to satisfy the first command and/or second command, the pseudo device may send the response from the pseudo device to one or more of the MDM service providers. For example, in step 930, the pseudo device may send the response to the second command received from the physical end user device to the first MDM service provider. The response may include device state information of the physical end user device so e.g., the first MDM service provider may verify that the operations associated with the first command have been properly completed by the physical end user device. For example, the response may include an indication that the data associated with the first MDM service provider has been removed from the physical end user device.

In some embodiments, the pseudo device may generate a new response based on the response to the second command received from the physical end user device. The new response may be sufficient to satisfy the first command received from the first MDM service provider. In some instances, the response may include an indication that an operation associated with the first command was completed or some other indication associated with the first command. For example, the new response may include an indication that the data associated with the first MDM service provider has been deployed from the pseudo device to the physical end user device or, alternatively, that the data associated with the first MDM service provider has been retracted from the physical end user device to the pseudo device.

In some embodiments, for example, the pseudo device may provide information to enterprise servers of one or more MDM service providers. For example, in providing information to the enterprise server of an MDM service provider, the pseudo device may send state information received from the physical end user device to the enterprise servers of the MDM service provider, which may, for instance, be configured to analyze such information and provide commands and/or other information back to the pseudo device, which may then relay or generate commands to be provided to the physical end user device.

In some embodiments, the pseudo device may receive a third command from a second MDM service provider. The third command may be configured to cause enforcement of a policy of the second MDM service provider at the physical end user device. The third command may be configured as discussed above with respect to configurations of the first command but with respect to the second MDM service provider rather than the first MDM service provider. For example, the third command may be a command to retract one or more of the policy-enforcement profile of the second MDM service provider, applications associated with the second MDM service provider, data associated with such applications, enterprise resources of the second MDM service provider, data generated at the physical end user device that is associated with the second MDM service provider, and/or other information. In some instances, the third command may be a selective wipe command configured to delete one or more of the policy-enforcement profile of the second MDM service provider, applications associated with the second MDM service provider, data associated with such applications, enterprise resources of the of the second MDM service provider, data generated at the physical end user device that is associated with the second MDM service provider, and/or other information. In some embodiments, the selective wipe command maintains (e.g., does not delete) the policy-enforcement profile of the second MDM service provider.

In some embodiments, the pseudo device may determine if a policy of the third command or a predicted resulting state of the physical end user device after the policy of the third command is implemented violates or otherwise conflicts with any other policy of an MDM service provider with which the pseudo device is enrolled. If there is no violation or conflict, the pseudo device may send a command to the physical end user device as described below. If there is a violation or conflict, the pseudo device may act in accordance with FIG. 16 discussed hereinafter.

In some embodiments, the pseudo device may send one or more commands from the pseudo device to the physical end user device. For example, the pseudo device may send a fourth command from the pseudo device to the physical end user device. The pseudo device may generate the fourth command based on the third command received from the second MDM service provider. The pseudo device may generate and send the fourth command to the physical end user device in response to receiving the third command. The fourth command may be different from the third command received from the second MDM service provider. In some instances, the fourth command may be the same as the third command received from the second MDM service provider. In such instances, the fourth command need not be generated at the pseudo device and may be retransmitted using the received third command.

The fourth command may be configured to enforce a policy associated with the third command. The fourth command may be configured as discussed above with respect to configurations of the second command but with respect to the second MDM service provider rather than the first MDM service provider. For example, the fourth command may be configured to cause the MDM cloud agent and/or the physical end user device to perform a retraction, deployment, selective wipe, restrict access to enterprises resources, grant access to enterprises resources, restrict access to functionality, reconfigure functionality, prevent modification to enterprise resources, prevent transmission of enterprise resources from the physical end user device, or any other configuration of a command discussed herein.

In some embodiments, the pseudo device may generate the fourth command. For example, the pseudo device may generate the fourth command on its own and without the involvement of the second MDM service provider. Particularly, the pseudo device may generate the fourth command without receiving the third command from the second MDM service provider.

In some embodiments, the pseudo device may receive a response to the fourth command from the physical end user device. For example, the pseudo device may determine whether the response is sufficient to satisfy the third command received from the second MDM service provider. In response to a determination that the response is insufficient to satisfy the third command, the pseudo device may send a command to the physical end user device configured to correct the state of the physical end user device such that a second response from the physical end user device may be sufficient to satisfy the third command.

In some embodiments, in response to a determination that the response is sufficient to satisfy the third and/or fourth command, the pseudo device may send a response from the pseudo device to one or more of the MDM service providers. For example, the pseudo device may send the response to the fourth command received from the physical end user device to the second MDM service provider. In some instances, the pseudo device may generate a new response based on the response to the fourth command received from the physical end user device. The new response may be sufficient to satisfy the third command received from the second MDM service provider. In some instances, the response may include an indication that an operation associated with the third command was completed or some other indication associated with the third command.

In some embodiments, the cloud computing environment may establish a second pseudo device within a server of the cloud representative of another physical end user device (e.g., a second physical end user device different from a first physical end user device). The second pseudo device representative of the second physical end user device may be provisioned for use with one or more MDM service providers. The second pseudo device may receive a first command at the pseudo device from an MDM service provider. The second pseudo device may send the second command or another command as discussed herein from the second pseudo device to the second physical end user device. The second pseudo device may receive a response from the physical end user device. The second pseudo device may send the response or a modified response to the MDM service provider as discussed herein. Although only two pseudo devices respectively representing two physical end user devices have been discussed, more than two pseudo device and physical end user devices are contemplated.

Figure 10:
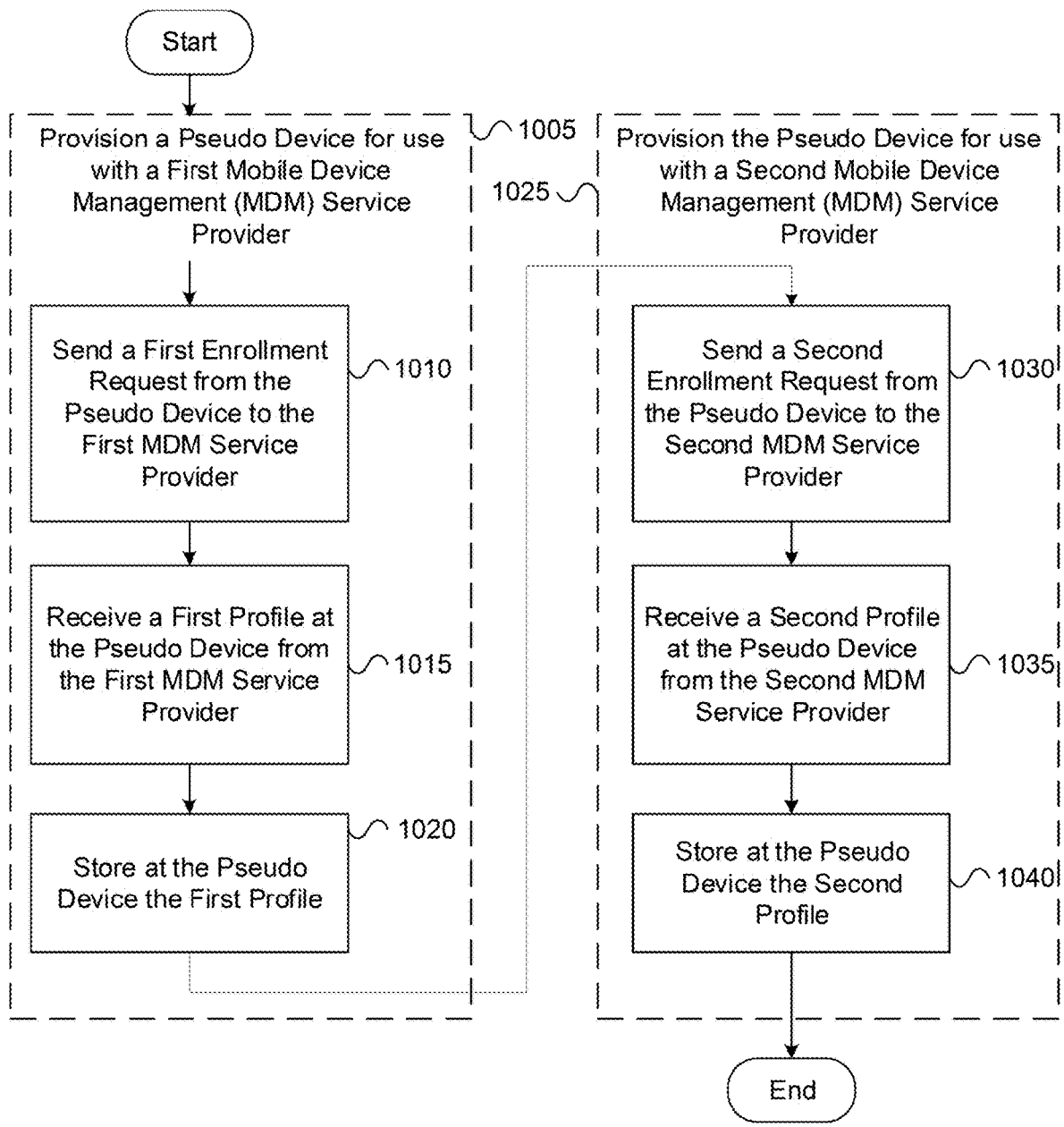
FIG. 10 depicts a flowchart that illustrates a method of provisioning a pseudo device for use with one or more mobile device management service providers in accordance with one or more illustrative aspects discussed herein.

FIG. 10 depicts a flowchart that illustrates a method of provisioning a pseudo device for use with one or more mobile device management service providers in accordance with one or more illustrative aspects discussed herein. In one or more embodiments, the method of FIG. 10 and/or one or more steps thereof may be performed by a computing device (e.g., generic computing device 201). In other embodiments, the method illustrated in FIG. 10 and/or one or more steps thereof may be embodied in computer-executable instructions that are stored in a computer-readable medium, such as a non-transitory computer-readable memory.

As seen in FIG. 10, the method may begin at step 1005 in which a pseudo device may be provisioned for use with a first MDM service provider. For example, in step 1005, the pseudo device may be provisioned for use with the first MDM service provider by, for example, performing one or more of steps 1010, 1015, and 1020 discussed herein. The pseudo device may appear to the first MDM service provider as the physical end user device the pseudo device represents. For example, the pseudo device may emulate and/or impersonate the physical end user device which the pseudo device represents and, thus, the pseudo device may appear to first MDM service provider as the actual physical end user device. For instance, in emulating and/or impersonating the physical end user device, the pseudo device may authenticate with, receive one or more commands and/or communications from, and/or send one or more messages and/or other communications to the first MDM service provider on behalf of the physical end user device as if the pseudo device were the physical end user device. The pseudo device may enroll with the first MDM service provider in the same manner as a typical physical mobile device would enroll with the first MDM service provider. In some instances, the pseudo device may appear to the first MDM service provider as a device different from the physical end user device but associated with the physical end user device.

In step 1010, the pseudo device may send a first enrollment request to the first MDM service provider of one or more MDM service providers. For example, in step 1010, the first enrollment request may be sent from the pseudo device to the first MDM service provider. In some instances, the pseudo device may cause another device to send the first enrollment request on behalf of the pseudo device. The enrollment request may include any information necessary for provisioning including, for example, security credentials, identity credentials, or the like.

In response, in step 1015, the pseudo device may receive a first policy-enforcement profile associated with the first MDM service provider. For example, in step 1015, the pseudo device may receive the first policy-enforcement profile from the first MDM service provider. In some instances, the pseudo device may receive the first policy-enforcement profile from another entity on behalf of the first MDM service provider. The first policy-enforcement profile may be configured to facilitate identification of the pseudo device and/or the first MDM service provider. The first policy-enforcement profile may facilitate secure communications between the pseudo device and the first MDM service provider. The policy-enforcement profile may be configured to identify one or more policies of the first MDM service provider that are to be enforced at the physical end user device as a condition of enrollment and/or access to the enterprise resources of the first MDM service provider.

In step 1020, the pseudo device may store the first policy-enforcement profile associated with the first MDM service provider. For example, in step 1020, the pseudo device may store the first policy-enforcement profile in an associated memory of one or more servers of the cloud computing environment. Once the pseudo device is provisioned for use with the first MDM service provider, the pseudo device may access enterprise resources of the first MDM service provider in accordance with policies set forth by the first MDM service provider. The pseudo device may receive commands from the first MDM service provider to manage the physical end user device as discussed above. For example, such commands may include one of deployment, retraction, and/or a selective wipe as discussed herein.

In step 1025, the pseudo device may be provisioned for use with the second MDM service provider by performing, for example, one or more of steps 1030, 1035, and 1040 discussed herein. The pseudo device may appear to the second MDM service provider as the physical end user device the pseudo device represents. For example, the pseudo device may impersonate the physical end user device which the pseudo device represents. The pseudo device may enroll with the second MDM service provider in the same manner as a typical mobile device would enroll with the second MDM service provider. In some instances, the pseudo device may appear to the second MDM service provider as a device different from the physical end user device but associated with the physical end user device.

In step 1030, the pseudo device may send a second enrollment request to the second MDM service provider of the one or more MDM service providers. For example, in step 1030, the second enrollment request may be sent from the pseudo device. In some instances, the psuedo device may cause another device to send the second enrollment request on behalf of the pseudo device. The enrollment request may include any information necessary for provisioning including, for example, security credentials, identity credentials, or the like.

In response, in step 1035, the pseudo device may receive a second policy-enforcement profile associated with the second MDM service provider. For example, in step 1035, the pseudo device may receive the second policy-enforcement profile from the second MDM service provider. In some instances, the pseudo device may receive the second policy-enforcement profile from another entity on behalf of the second MDM service provider. The second policy-enforcement profile may be configured to facilitate identification of the pseudo device and/or the second MDM service provider. The second policy-enforcement profile may be configured to facilitate secure communications between the pseudo device and the second MDM service provider. The policy-enforcement profile may be configured to identify one or more policies of the second MDM service provider that are to be enforced at the physical end user device as a condition of enrollment and/or access to the enterprise resources of the second MDM service provider.

In step 1040, the pseudo device may store the second policy-enforcement profile associated with the second MDM service provider. For example, in step 1040, the pseudo device may store the second policy-enforcement profile in an associated memory of one or more servers of the cloud computing environment. Once the pseudo device is provisioned for use with the second service provider, the pseudo device may access enterprise resources of the second MDM service provider. The pseudo device may receive commands from the second MDM service provider to manage the physical end user device. Such commands may include one of deployment, retraction, and/or a selective wipe as discussed herein.

In some embodiments, the memory associated with the pseudo device located at one or more servers of the cloud computing environment may concurrently store both the first policy-enforcement profile associated with the first MDM service provider and the second policy-enforcement profile associated with the second MDM service provider. In some embodiments, the physical end user device may have insufficient resources to concurrently store and/or implement both the first policy-enforcement profile associated with the first MDM service provider and the second policy-enforcement profile associated with the second MDM service provider.

In some embodiments, a second pseudo device representing a second physical end user device may be provisioned for use with one or more MDM service providers. For example, the second pseudo device may send a first enrollment request from the second pseudo device to a first MDM service provider and, in response, may receive a policy-enforcement profile from the first MDM service provider. The second pseudo device may store the policy-enforcement profile in memory associated with the second pseudo device. Once the pseudo device is provisioned for use with the first MDM service provider, the second pseudo device may access enterprise resources of the first MDM service provider. The second pseudo device may send a second enrollment request from the second pseudo device to a second MDM service provider and, in response, may receive a policy-enforcement profile from the second MDM service provider. The second pseudo device may store the policy-enforcement profile in the memory associated with the second pseudo device. Once the pseudo device is provisioned for use with the second MDM service provider, the second pseudo device may access enterprise resources of the second MDM service provider.

In some embodiments, multiple pseudo devices may be associated with the same user. The pseudo devices may be established within a cloud computing environment. For example, a first pseudo device may be representative of a first physical end user device associated with a user. A second pseudo device may be representative of a second physical end user device associated with the same user. The second physical end user device may be different from the first physical end user device. In this example, the first and second pseudo devices may be provisioned for use with the same MDM service provider and/or different MDM service providers.

Figure 11:
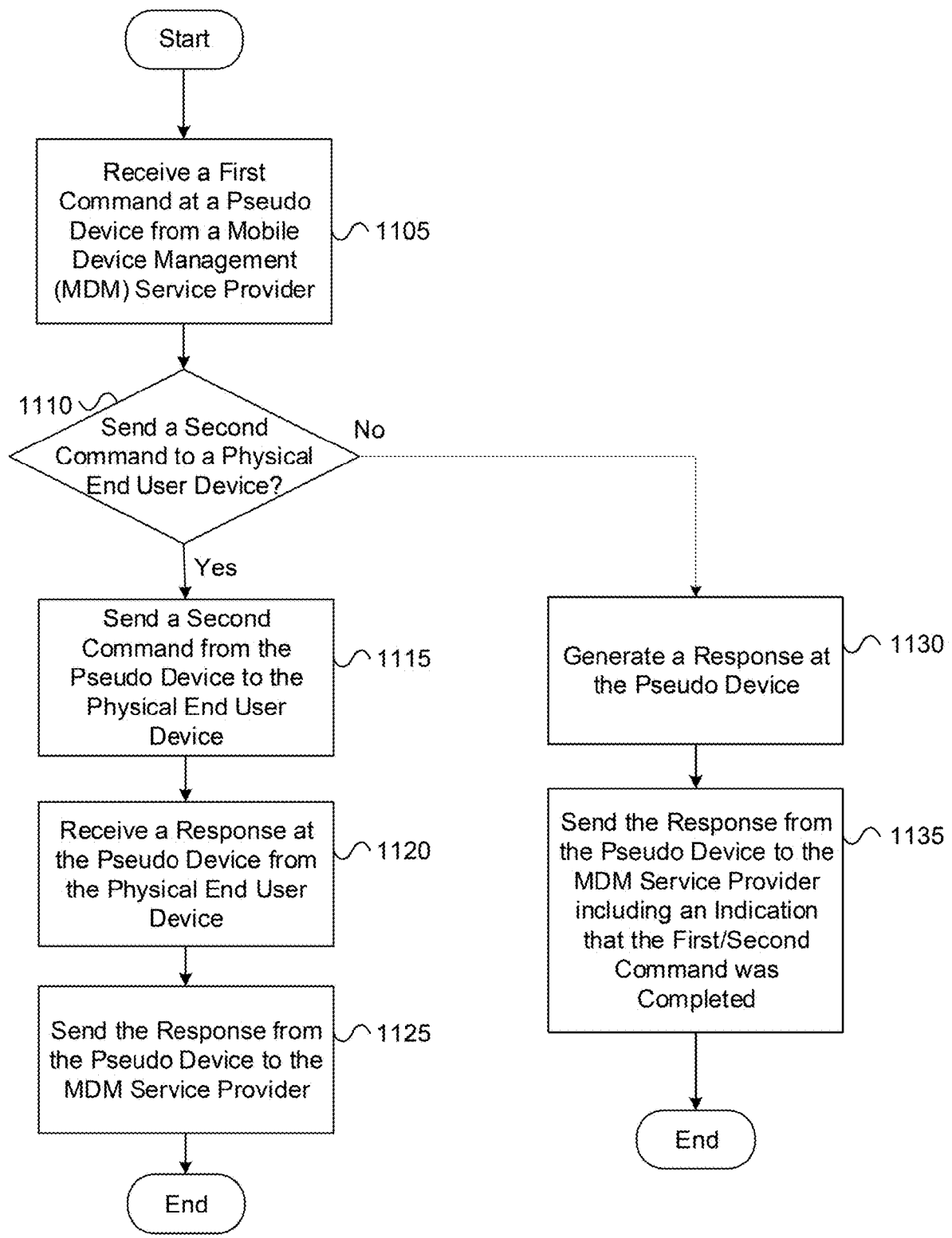
FIG. 11 depicts a flowchart that illustrates a method of responding to a command from a mobile device management service provider in accordance with one or more illustrative aspects discussed herein.

FIG. 11 depicts a flowchart that illustrates a method of responding to a command from a mobile device management service provider in accordance with one or more illustrative aspects discussed herein. In one or more embodiments, the method of FIG. 11 and/or one or more steps thereof may be performed by a computing device (e.g., generic computing device 201). In other embodiments, the method illustrated in FIG. 11 and/or one or more steps thereof may be embodied in computer-executable instructions that are stored in a computer-readable medium, such as a non-transitory computer-readable memory.

As seen in FIG. 11, the method may begin at step 1105 in which a pseudo device may receive one or more commands. For example, in step 1105, the pseudo device may receive a first command from a first MDM service provider. In some instances, the first command may be received from an entity or device separate from the first MDM service provider but may be sent on behalf the first MDM service provider.

The first command may be configured as discussed above in connection with FIG. 9. For example, the first command may be configured to cause an MDM cloud agent running on the physical end user device and/or the physical end user device to perform operations associated with retraction of enterprise resources, deployment of enterprise resources, selective wipe of enterprise resources, restrict access to enterprises resources, grant access to enterprise resources, restrict access to functionality, reconfigure functionality, prevent modification to enterprise resources, prevent transmission of enterprise resources from the physical end user device, or any other configuration of a command discussed herein.

In step 1110, the pseudo device may determine to whom a command and/or message should be sent. For example, in step 1110, the pseudo device may determine whether to send a second command to the physical end user device and/or the first MDM service provider. The determination may be based on one or more factors. For example, a factor may include whether information not present at the pseudo device is needed from the physical end user device to respond to one or more commands received from the one or more MDM service providers. For example, a factor may include whether a policy associated with the one or more commands received from the one or more MDM service providers' conflicts with another policy of the one or more MDM service providers.

In some embodiments, the pseudo device may generate and send a query to the physical end user device. The query may request state information of the physical end user device. In response, the physical end user device may determine and send its state information to the pseudo device. The pseudo device may then determine whether the received state information of the physical end user device matches desired state information for the physical end user device. The pseudo device may determine that desired state information based at least in part on the first command received from the first MDM service provider. If the received state information does not match the desired state information, the pseudo device may determine to send a second command to the physical end user device to achieve the desired state. If the received state information matches the desired state information, the pseudo device may determine not to send the second command to the physical end user device. Because the received state information matches the desired state information and because the desired state information may be determined based on the first command received from the first MDM service provider, the pseudo device may determine not to send the second command to the physical end user device since the desired state associated with the first command is already the state of the physical end user device. Additionally or alternatively, in some embodiments, a query need not be sent to the physical end user device. For example, the physical end user device may, periodically and/or when a state changes occur within the physical end user device, send updated state information to the pseudo device. As a result, the pseudo device may maintain a log of current and past state information of the physical end user device. Because the current state information of the physical end user device is present at the pseudo device, the pseudo device may determine whether the state information of the physical end user device matches the desired state information without sending the query to the physical end user device.

In step 1115, in response to a determination to send a second command to the physical end user device, the pseudo device may send the second command from the pseudo device to the physical end user device. The second command may be configured to enforce policies of the one or more MDM service providers. The second command may be configured as discussed above in connection with FIG. 9. For example, the second command may be configured to cause an MDM cloud agent running on the physical end user device and/or the physical end user device to perform operations associated with retraction of enterprise resources, deployment of enterprise resources, a selective wipe of enterprise resources, restrict access to enterprise resources, grant access to enterprises resources, restrict access to functionality, reconfigure functionality, prevent modification to enterprise resources, prevent transmission of enterprise resources from the physical end user device, or any other configuration of a command discussed herein.

In step 1120, the pseudo device may receive a response from the physical end user device. For example, in step 1120, the pseudo device may receive an indication that that an operation associated with sent second command was completed. The response may include device state information of the physical end user device before and/or after the operation associated with the second command was completed. For example, the response may include an indication that the applications, application data, and/or other data associated with one or more MDM service providers has been deleted from the physical end user device. The response may include an indication that personal applications and personal data has been maintained (e.g., not deleted) by the physical end user device. The response may be configured similar to the other responses discussed herein.

In some embodiments, the pseudo device may determine whether the response from the physical end user device satisfies the first command received from the first MDM service provider (e.g. the state of the physical end user device matches the desired state). If the pseudo device determines that the response does not satisfy the response the pseudo device may send a third command to the physical end user device. The third command may be configured to cause on operation to obtain the desired result of the first command. Subsequently, the pseudo device may receive another response from the physical end user device.

In step 1125, the pseudo device may send a response to one or more MDM service providers. For example, in step 1125, the pseudo device may send a response to the first command to the first MDM service provider. The response may be sent if the pseudo device determines that the response is sufficient to satisfy the first command. In some instances, the pseudo device may generate a modified response based on the response received from the physical end user device. The modified response may also be based on other factors, such as, for example, to add an indication that an operation associated with the first command was completed. The pseudo device may send the modified response to the first MDM service provider. The response may be configured similar to any response discussed herein and, thus, may for example include device state information for the first MDM service provider to analyze and potentially respond thereto.

In step 1130, the pseudo device might not send a second command to the physical end user device. For example, in step 1130, the pseudo device may, in response to determining not to send the second command to the physical end user device, locally generate a response to the first command sent from the first MDM service provider. In some instances, the pseudo device may receive a response from a device or entity different from the physical end user device to be incorporated into the response to the first command. The generated and/or received response to the first command may include, for example, information stored by the pseudo device, or any other information. The response may include an indication that an operation associated with the first command was completed. For example, the response may include an indication that a selective wipe has been completed at the physical end user device.

In step 1135, the pseudo device may send the response from the pseudo device to one or more MDM service providers. For example, in step 1135, the pseudo device may send the locally generated response to the first command from the pseudo device to the first MDM service provider. The response may be sent to the first MDM service provider without sending any commands (e.g., a first command and/or a second command) to the physical end user device. Thus, the response may be sent on behalf of the physical end user device without any involvement by the physical end user device. For example, the pseudo device may receive the first command and send a response to the first MDM service provider independent of any operations by the physical end user device.

In some embodiments, a second pseudo device representing a second physical end user device may receive a first command from an MDM service provider. The second pseudo device may determine whether to send a second command to the second physical end user device based on any factors discussed herein. In response to determining to send the second command to the second physical end user device, the second pseudo device may send the second command from the second pseudo device to the second physical end user device. The second pseudo device may then receive a response from the second physical end user device. The second pseudo device may then send the response or a modified response to the MDM service provider. In response to determining not to send any command to the second physical end user device, the second pseudo device may generate a response to the first command including, for example, an indication that an operation associated with the first command was completed. The pseudo device may send the response to the MDM service provider.

Figure 12:
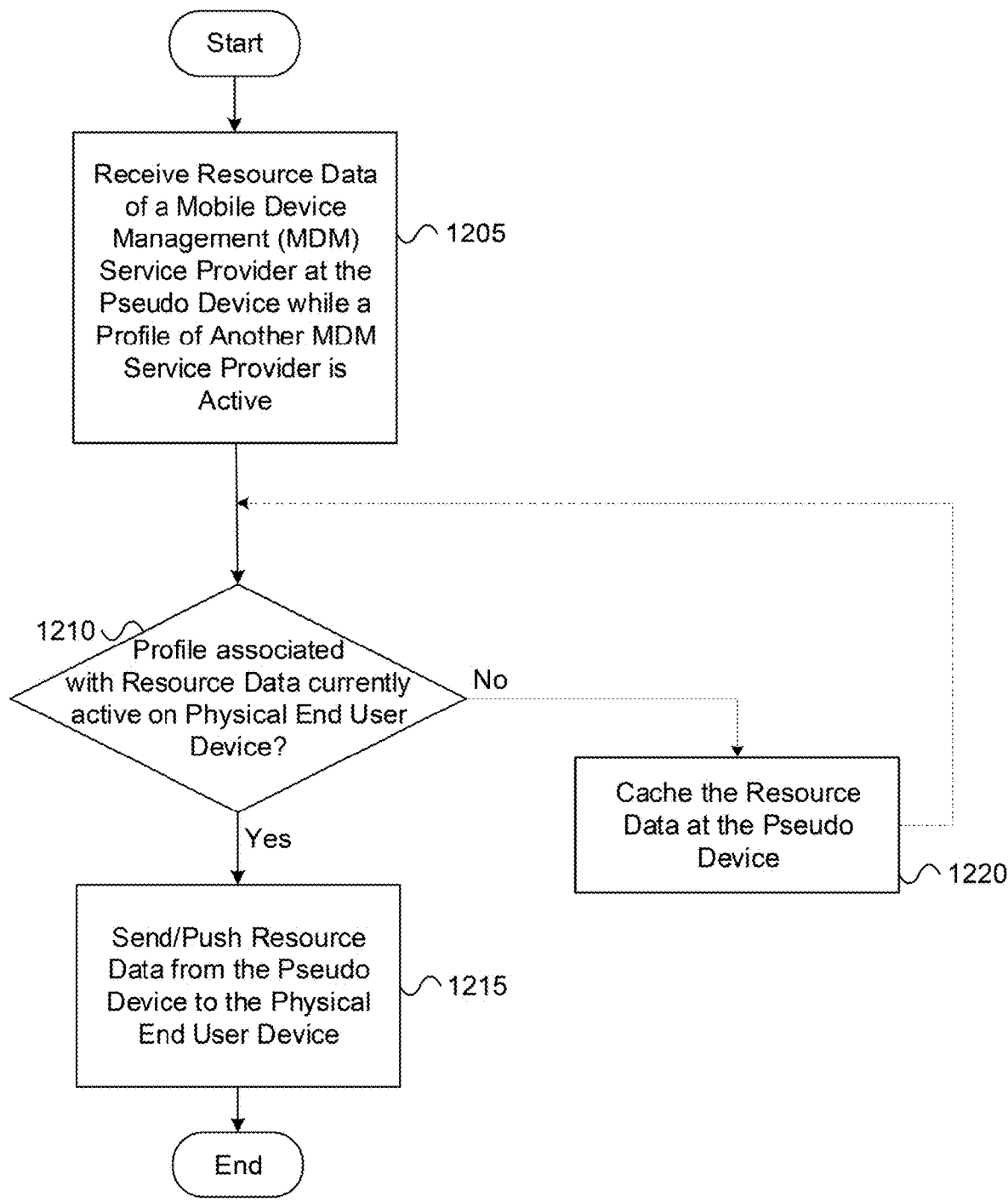
FIG. 12 depicts a flowchart that illustrates a method of pushing resource data to the physical end user device in accordance with one or more illustrative aspects discussed herein.

FIG. 12 depicts a flowchart that illustrates a method of pushing resource data to the physical end user device in accordance with one or more illustrative aspects discussed herein. In one or more embodiments, the method of FIG. 12 and/or one or more steps thereof may be performed by a computing device (e.g., generic computing device 201). In other embodiments, the method illustrated in FIG. 12 and/or one or more steps thereof may be embodied in computer-executable instructions that are stored in a computer-readable medium, such as a non-transitory computer-readable memory.

As seen in FIG. 12, the method may begin at step 1205 in which a pseudo device may receive one or more enterprise resources (e.g., resource data). For example, in step 1205, the pseudo device may receive resource data of a first MDM service provider from the first MDM service provider. The resource data may include documents, charts, software, applications, application data, or any other data associated with the first MDM service provider. The resource data may be received during a time period in which a policy-enforcement profile of a second different MDM service provider is active or in use by the physical end user device. For example, the pseudo device may receive an application from the first MDM service provider that may be used at the physical end user device only when the policy-enforcement profile of the first MDM service provider is active or in use by the physical end user device. However, the application may be received by the pseudo device when the policy-enforcement profile of the first MDM service provider is not active or not in use by the physical end user device.

Similarly, the pseudo device may receive the first command from the first MDM service provider during a time period in which a policy-enforcement profile associated with a second MDM service provider (different from the first MDM service provider) is active on or at the physical end user device. For example, the pseudo device may receive the first command from the first MDM service provider when the policy-enforcement profile of the first MDM service provider in not active or in use by the physical end user device and/or when the policy-enforcement profile of the second MDM service provider is active or in use by the physical end user device.

In some embodiments, the pseudo device may receive the resource data and/or the first command from the first MDM service provider during a time period in which no policy-enforcement profile of a MDM service provider is active on or at the physical end user device.

In some embodiments, the receipt of the resource data may be in response to a request for the resource data initiated by the physical end user device. For example, the physical end user device may send the request for resource data from the physical end user device directly to the first MDM service provider without involvement of the pseudo device. In some instances, the physical end user device may send the request for resource data of the first MDM service provider to the pseudo device. The pseudo device may then send the request to the first MDM service provider. In some instances, the pseudo device may modify the request prior to sending the request to the first MDM service provider. In some embodiments, the physical end user device may receive the resource data in response to a request initiated by the pseudo device and sent to the first MDM service provider.

In step 1210, the pseudo device may determine what profile is currently active on the pseudo device. For example, in step 1210, the pseudo device may make a determination of whether the policy-enforcement profile of the first MDM service provider is currently active on the physical end user device. In some instances, the pseudo device may send a command, query or request to the physical end user device requesting the physical end user device (and/or an MDM cloud agent installed on the physical end user device) to send the pseudo device the current device state information of the physical end user device. The current device state information may include, for example, an indication of which policy-enforcement profile is currently in use on the physical end user device, an indication of the current enterprise resources in use by the physical end user device, the geographic location of the physical end user device, an indication of whether the physical end user device is within a geographic fence set by the one of the MDM service providers, or any other information. In response, the physical end user device (and/or the MDM cloud agent installed on the physical end user device) may determine the current device state information of the physical end user device and send the current state information to the pseudo device.

In some embodiments, the pseudo device may make the determination of whether the policy-enforcement profile of the first MDM service provider is currently active on the physical end user device without sending a request to the physical end user device. The physical end user device (and/or the MDM cloud agent) may send current status information periodically and/or as the result in a change in the current status information previously sent to the pseudo device. For example, in determining whether a change in the device state information has been detected, the MDM cloud agent and/or the physical end user device may, for instance, determine whether a new application has been installed on and/or added to the physical end user device, whether an application has been deleted from the physical end user device, whether the network connection being used the physical end user device has changed, whether the geographic location in which the physical end user device is being used as changed, and/or any other change in the device state information discussed herein. Once a change in device state information has been detected, the MDM cloud agent and/or the physical end user device may send (e.g., push) information associated with the change to the pseudo device so that the pseudo device may maintain a log of the current and past device state information of the physical end user device.

In step 1215, the pseudo device may push the resource data to the physical end user device. For example, in step 1215, in response to determining that the policy-enforcement profile of the first MDM service provider is currently active at (e.g., in use by) the physical end user device, the pseudo device may send the resource data of the first MDM service provider from the pseudo device to the physical end user device. As a result, the physical end user device may access and/or receive the resource data of the first MDM service provider when the policy-enforcement profile is in use by the physical end user device.

In some embodiments, the physical end user device may initiate another request (e.g., a second request) for more resource data of the first MDM service provider. The physical end user device may send the second request to the pseudo device. The pseudo device may then send the second request for more resource data to the first MDM service provider. In response, the first MDM service provider may then send more resource data to the pseudo device. The pseudo device may then send such resource data to the physical end user device when the policy-enforcement profile of the first MDM service provider is in use by the physical end user device.

In some embodiments, once the pseudo device has determined that the policy-enforcement profile is in use at the physical end user device, the pseudo device may send an indication of the determination to the first MDM service provider. The first MDM service provider may then transmit the resource data to the physical end user device directly (e.g., without further involvement of the pseudo device). In some embodiments, subsequent requests for resource data may be sent directly from the physical end user device to the first MDM service provider (e.g., without involvement of the pseudo device).

In step 1220, the pseudo device may store the resource data in memory associated with the pseudo device. For example, in step 1220, in response to determining that the policy-enforcement profile of the first MDM service provider is not currently active at (e.g., not in use by) the physical end user device, the pseudo device may cache or otherwise store the resource data of the first MDM service provider until the policy-enforcement profile of the first MDM service provider becomes active at the physical end user device. The pseudo device may again determine whether the policy-enforcement profile of the first MDM service provider is active at the physical end user device by, for example, sending a request for the current state of the physical end user device as discussed herein. Once or when the pseudo device determines that the policy-enforcement profile of the first MDM service provider is currently active at the physical end user device, the pseudo device may push (e.g., automatically send) the resource data from the cache associated with the pseudo device to the physical end user device. In some embodiments, once the pseudo device determines that the policy-enforcement profile of the first MDM service provider is active at the physical end user device, the pseudo device may permit the resource data to be pulled (e.g., sent in response to a request by the physical end user device) from the cache associated with the pseudo device to the physical end user device.

In some embodiments, a second pseudo device representing a second physical end user device may receive resource data of e.g., a first MDM service provider and/or a first command from the first MDM service provider. The resource data and/or the first command may be received during a time period in which a policy-enforcement profile of a second MDM service provider (different from the first MDM service provider) is active on the second physical end user device. The second pseudo device may cache the resource data of the first MDM service provider in memory associated with the second pseudo device when a policy-enforcement profile of the first MDM service provider is not currently active on the second physical end user device. The second pseudo device may push the resource data of the first MDM service provider when the policy-enforcement profile of the first MDM service provider is currently active on the second physical end user device.

Figure 13:
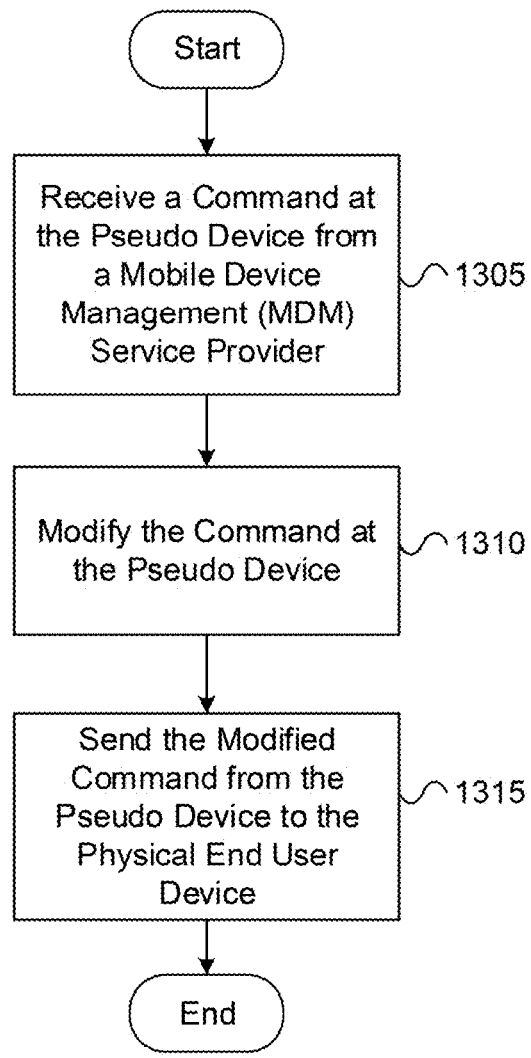
FIG. 13 depicts a flowchart that illustrates a method of modifying a command at the pseudo device in accordance with one or more illustrative aspects discussed herein.

FIG. 13 depicts a flowchart that illustrates a method of modifying a command at the pseudo device in accordance with one or more illustrative aspects discussed herein. In one or more embodiments, the method of FIG. 13 and/or one or more steps thereof may be performed by a computing device (e.g., generic computing device 201). In other embodiments, the method illustrated in FIG. 13 and/or one or more steps thereof may be embodied in computer-executable instructions that are stored in a computer-readable medium, such as a non-transitory computer-readable memory.

As seen in FIG. 13, the method may begin at step 1305 in which a pseudo device may receive one or more commands from one or more MDM service providers. For example, in step 1305, the pseudo device may receive a first command from a first MDM service provider. The command may be any command discussed herein including, for example, a selective wipe command, a retraction command, and/or a deployment command.

At step 1310, the pseudo device may modify the one or more commands. For example, in step 1310, the pseudo device may modify the received first command to produce a modified command. The modification may be based on one or more policy-enforcement profiles, policies of one or more MDM service providers, the current state of the physical end user device, and/or any other factor. The modified command may be configured to perform an operation at the physical end user device once the command is received by the physical end user device. For example, the modified command may be configured to deploy resource data from the pseudo device to the physical end user device, retract resource data from the physical end user device to the pseudo device, perform a selective wipe, commands associated with resolving conflicts, and/or perform any other operation discussed herein.

At step 1315, the pseudo device may send one or more commands to the physical end user device. For example, in step 1315, the pseudo device may send the modified command from the pseudo device to the physical end user device. As a result, the physical end user device may perform an operation of the modified command which may include, for example, deleting data associated with one or more MDM service providers or any other operations discussed herein. Performing the operation may result in a change in device state information monitored by the MDM cloud agent running on the physical end user device, the resulting device state change may be sent from the physical end user device to the pseudo device so that the pseudo device may continue to enforce policies of the MDM service providers.

In some embodiments, a second pseudo device representing a second physical end user device may receive a command from an MDM service provider. The second pseudo device may modify the command to produce a modified command. The second pseudo device may then send the modified command from the second pseudo device to the second physical end user device. The second physical end user device may then perform an operation associated with the command and send resulting changes in device state information to the second pseudo device.

In some embodiments, the pseudo device may modify the command received from the MDM service provider prior to sending the modified command to the physical end user device based on one or more factors. For example, the pseudo device may modify the command so that the physical end user device may process (e.g., understand) the modified command. In particular, the command received from the MDM service provider may be associated with a protocol or standard that the physical end user device might not be able to process and/or otherwise understand. The pseudo device may modify the received command so that the modified command may be associated with a different protocol or standard that the physical end user device may be able to process and/or otherwise understand.

Figure 14:
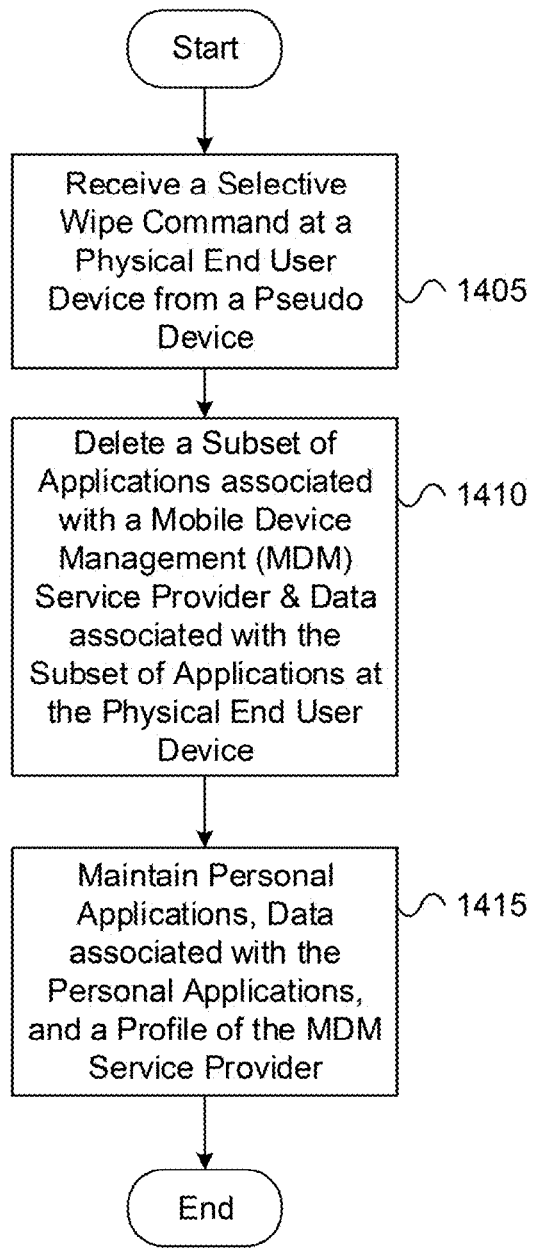
FIG. 14 depicts a flowchart that illustrates a method of applying a selective wipe command in accordance with one or more illustrative aspects discussed herein.

FIG. 14 depicts a flowchart that illustrates a method of applying a selective wipe command in accordance with one or more illustrative aspects discussed herein. In one or more embodiments, the method of FIG. 14 and/or one or more steps thereof may be performed by a computing device (e.g., generic computing device 201). In other embodiments, the method illustrated in FIG. 14 and/or one or more steps thereof may be embodied in computer-executable instructions that are stored in a computer-readable medium, such as a non-transitory computer-readable memory.

As seen in FIG. 14, the method may begin at step 1405 in which a physical end user device may receive a selective wipe command from a pseudo device. For example, in step 1405, the pseudo device may send a selective wipe command to the physical end user device in response to receiving a selective wipe command from a first MDM service provider. In some embodiments, the pseudo device may generate the selective wipe command. The selective wipe command may be configured to cause enterprise resources (e.g., resource data) to be deleted at the physical end user device. For example, the selective wipe command may be configured to cause a subset of applications associated with the first MDM service provider and data associated with the subset of applications to be deleted at the physical end user device. The selective wipe command may be configured to maintain personal information. For example, the selective wipe command may maintain (e.g., not delete) personal applications and data associated with personal applications and optionally a policy-enforcement profile of the first MDM service provider.

In step 1410, the physical end user device may, in response to receiving the selective wipe command, delete resource data. For example, in step 1410, the physical end user device may delete a subset of applications associated with the first MDM service provider, data associated with the subset of applications, data generated by the physical end user device using resource data of the first MDM service provider, and/or other data associated with the first MDM service provider.

In step 1415, the physical end user device may maintain personal information. For example, in step 1415, the physical end user device may maintain personal applications, data associated with personal applications, personal data, a policy-enforcement profile associated with one or more MDM service providers, and/or any other data independent of association with the first MDM service provider. In such instances, the maintained information is not deleted by the physical end user device and, therefore, continues to be stored by the physical end user device. In some embodiments, the policy-enforcement profile of the first MDM service provider is not deleted.

In some exemplary embodiments, a change in device state information may be detected by the MDM cloud agent, the pseudo device, and/or the first MDM service provider based on device state information provided by the MDM cloud agent to the pseudo device and/or the first MDM service provider. One or more of the MDM cloud agent, the pseudo device, and/or the first MDM service provider may determine to selectively wipe the physical end user device. For example, the first MDM service provider may send to the pseudo device a selective wipe command. The pseudo device may then send the selective wipe command to the physical end user device. In some instances, the pseudo device may generate and send the selective wipe command to the physical end user device. In response to receiving a selective wipe command or on based on a local determination, the MDM cloud agent and/or the physical end user device may wipe resources associated with the first MDM service provider while leaving personal data and/or data not associated with the first MDM service provider (e.g., data associated with another MDM service provider).

In some embodiments, the selective wipe may only wipe or delete a subset of the enterprise resources in use by the physical end user device. In some embodiments, the selective wipe may only delete data associated with the first MDM service provider accessed within a certain time period.

In some embodiments, a second physical end user device may receive a selective wipe command from a second pseudo device representing the second physical end user device. The second physical end user device may delete a subset of resource data including, for example, a subset of applications associated with the MDM service provider, data associated with the subset of applications, and/or other data associated with the MDM service provider. The second physical end user device may maintain personal information including, for example, personal applications, data associated with the personal applications, and/or other personal data. The second physical end user may also maintain the policy-enforcement profile of the MDM service provider.

Figure 15:
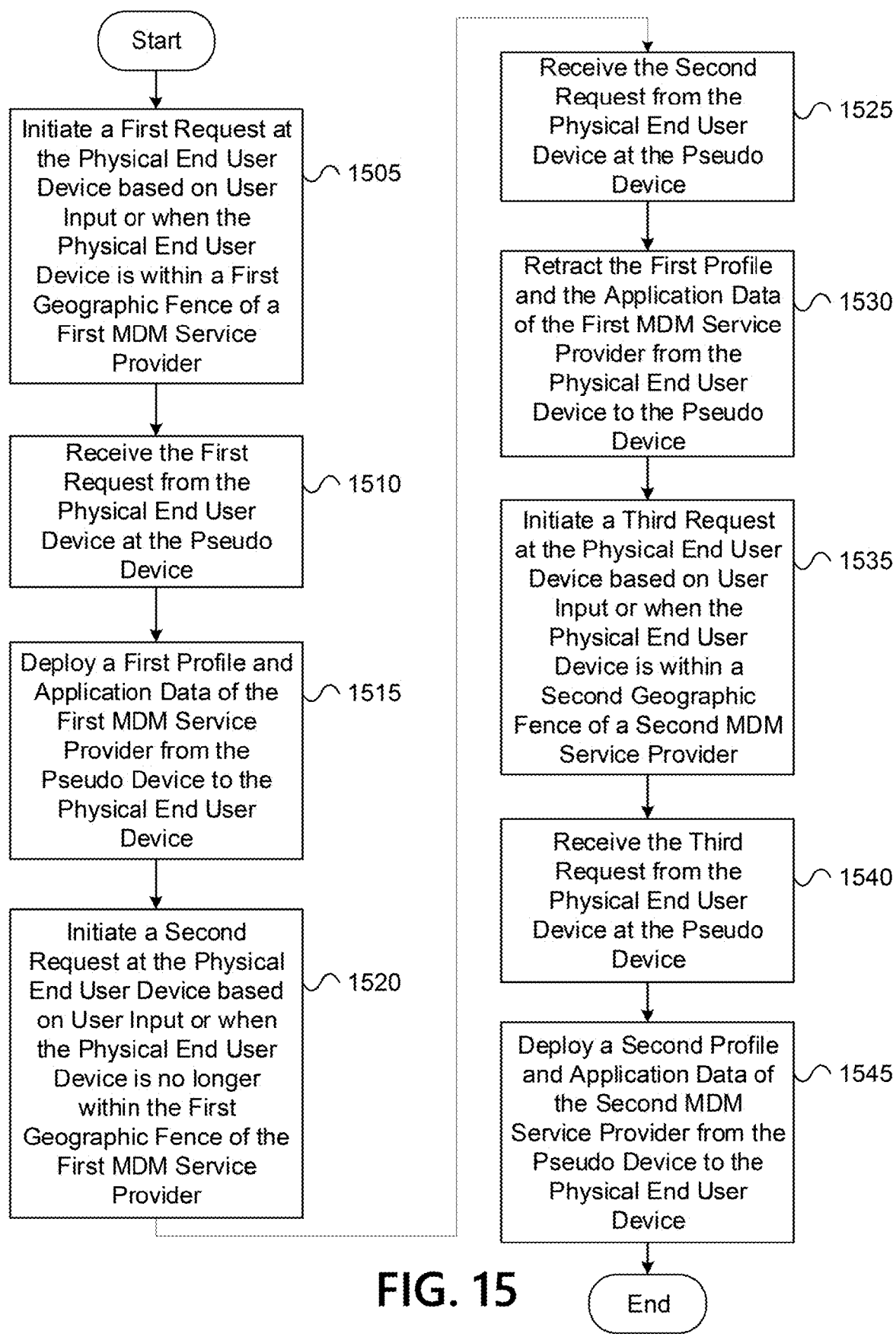
FIG. 15 depicts a flowchart that illustrates a method of deploying information to a physical end user device and retracting information from the physical end user device in accordance with one or more illustrative aspects discussed herein.

FIG. 15 depicts a flowchart that illustrates a method of deploying information to a physical end user device and retracting information from the physical end user device in accordance with one or more illustrative aspects discussed herein. In one or more embodiments, the method of FIG. 15 and/or one or more steps thereof may be performed by a computing device (e.g., generic computing device 201). In other embodiments, the method illustrated in FIG. 15 and/or one or more steps thereof may be embodied in computer-executable instructions that are stored in a computer-readable medium, such as a non-transitory computer-readable memory.

As seen in FIG. 15, the method may begin at step 1505 in which a physical end user device may initiate one or more requests for resource data from one or more MDM service providers. For example, in step 1505, the physical end user device may initiate a first request based on user input or when the physical end user device comes within a first geographic fence of the first MDM service provider. Particularly, the user may at any time initiate a request for resource data of the one or more MDM service providers. Additionally or alternatively, the physical end user device may automatically (e.g., without involvement of the user) initiate a request for resource data of, for example, the first MDM service provider when the physical end user device determines that the physical end user device is within one or more geographic fences preset by the first MDM service provider. For example, the physical end user device may include global positioning system (GPS) monitored by an MDM cloud agent running on the physical end user device. The MDM cloud agent may generate a request when the MDM cloud agent determines that the physical end user device is within a geographic fence associated with a geographic location of one or more buildings or campuses of the first MDM service provider. In some embodiments, a geographic fence may be associated with a geographic location of the home of the user of the of physical end user device. Additionally or alternatively, a geographic fence may be associated with any other area defined by the first MDM service provider.

In step 1510, the pseudo device may receive one or more requests from the physical end user device. For example, in step 1510, the pseudo device may receive the first request from the physical end user device. The request may include an indication that the request was initiated based on user input or an indication that the request that the physical end user device is within the first geographic fence of the first MDM service provider.

In step 1515, the pseudo device may deploy (e.g., send) data of the first MDM service provider. For example, in step 1515, the pseudo device may deploy a policy-enforcement profile of the first MDM service provider, application data of the first MDM service provider, resource data of the first MDM service provider stored in a cache or other memory associated with the pseudo device as discussed herein in connection with FIG. 12, and/or any other data associated with the first MDM service provider. As a result, the physical end user device may utilize and/or interact with resource data associated with the first MDM service provider. In some embodiments, the first MDM service provider may receive the request from the pseudo device and may send the resource data to the pseudo device for deployment to the physical end user device.

In step 1520, the physical end user device may initiate a second request to the pseudo device. For example, in step 1520, the physical end user device may initiate a second request based on user input or based on when the physical end user device is no longer within the first geographic fence of the first MDM service provider. Particularly, the user may at any time initiate a request that the user no longer needs resource data of the one or more MDM service providers. Additionally or alternatively, the physical end user device may automatically (e.g., without involvement of the user) initiate a request that the physical end user device may longer utilize resource data of the first MDM service provider when the physical end user device determines that the physical end user device is no longer within one or more geographic fences preset by the first MDM service provider.

In step 1525, the pseudo device may receive the second request from the physical end user device. The second request may include an indication that the user no longer needs access to the resource data of the first MDM service provider. The second request may include an indication that the physical end user device is no longer within the first geographic fence of the first MDM service provider and/or an indication that the physical end user device may no longer use or have access to resource data of the first MDM service provider.

In step 1530, the pseudo device may, in response to receiving the second request, retract one or more policy-enforcement profiles of one or more MDM service providers and/or resource data of the one or more MDM service providers. For example, in step 1530, the pseudo device may retract from the physical end user device, for example, applications of the first MDM service provider, application data of those applications, documents of the first MDM service provider, data generated by the physical end user device based on resource data of the first MDM service provider, and/or any other data associated with the first MDM service provider. As a result, such aforementioned resources are removed from the physical end user device and sent to the pseudo device. In some embodiments, the policy-enforcement profile of the first MDM service provider and/or select resource data may be maintained (e.g., not deleted) at the physical end user device.

In step 1535, the physical end user device may initiate a third request for resource data of one or more MDM service providers. For example, in step 1535, the physical end user device may initiate the third request for resource data of a second MDM service provider based on user input or when the physical end user device is within a second geographic fence of the second MDM service provider. Particularly, the user may at any time initiate a request for resource data of the one or more MDM service providers. The physical end user device may also automatically (e.g., without involvement of the user) initiate a request for resource data of, for example, the second MDM service provider when the physical end user device determines that the physical end user device is within one or more geographic fences preset by the second MDM service provider. For example, a geographic fence may be associated with a geographic location of one or more buildings or campuses of the second MDM service provider. A geographic fence may be associated with a geographic location of the home of the user of the of physical end user device. A geographic fence may be associated with any other area defined by the second MDM service provider.

In step 1540, the pseudo device may receive one or more requests from the physical end user device. For example, in step 1540, the pseudo device may receive the third request from the physical end user device. The request may include an indication that the request was initiated based on user input or an indication that the request that the physical end user device is within the second geographic fence of the second MDM service provider.

In step 1545, the pseudo device may deploy (e.g., send) data of the second MDM service provider. For example, in step 1545, the pseudo device may deploy a policy-enforcement profile of the second MDM service provider, application data of the second MDM service provider, resource data of the second MDM service provider stored in a cache or other memory associated with the pseudo device as discussed herein in connection with FIG. 12, and/or any other data associated with the second MDM service provider. As a result, the physical end user device may utilize and/or interact with resource data associated with the second MDM service provider.

In some embodiments, a second physical end user device may initiate a first request based on user input or when the second physical end user device is within a geographic fence of a first MDM service provider. A second pseudo device representing a second physical end user device may receive the first request from the second physical end user device. In response, the second pseudo device may deploy one or more of a policy-enforcement profile of the first MDM service provider and resource data of the first MDM service provider including, for example, applications of the first MDM service provider, application data of those applications, and/or other data associated with the first MDM service provider. The second physical end user device may initiate a second request based on user input or when the second physical end user device is no longer with the geographic fence of the first MDM service provider. The second pseudo device may receive the second request from the second physical end user device. In response, the second pseudo device may retract one or more of the policy-enforcement profile and the resource data of the first MDM service provider from the second physical end user device (e.g., remove the resources from the second physical end user device and send them to the second pseudo device). The second physical end user device may initiate a third request based on user input or when the physical end user device is within a geographic fence of a second MDM service provider. The second pseudo device may receive the second request from the second physical end user device. The second pseudo device may then deploy to the second physical end user device one or more of the policy-enforcement profile of the second MDM service provider and/or resource data of the second MDM service provider including, for example, applications of the second MDM service provider, application data of those applications, and/or any other data associated with the second MDM service provider.

Figure 16:
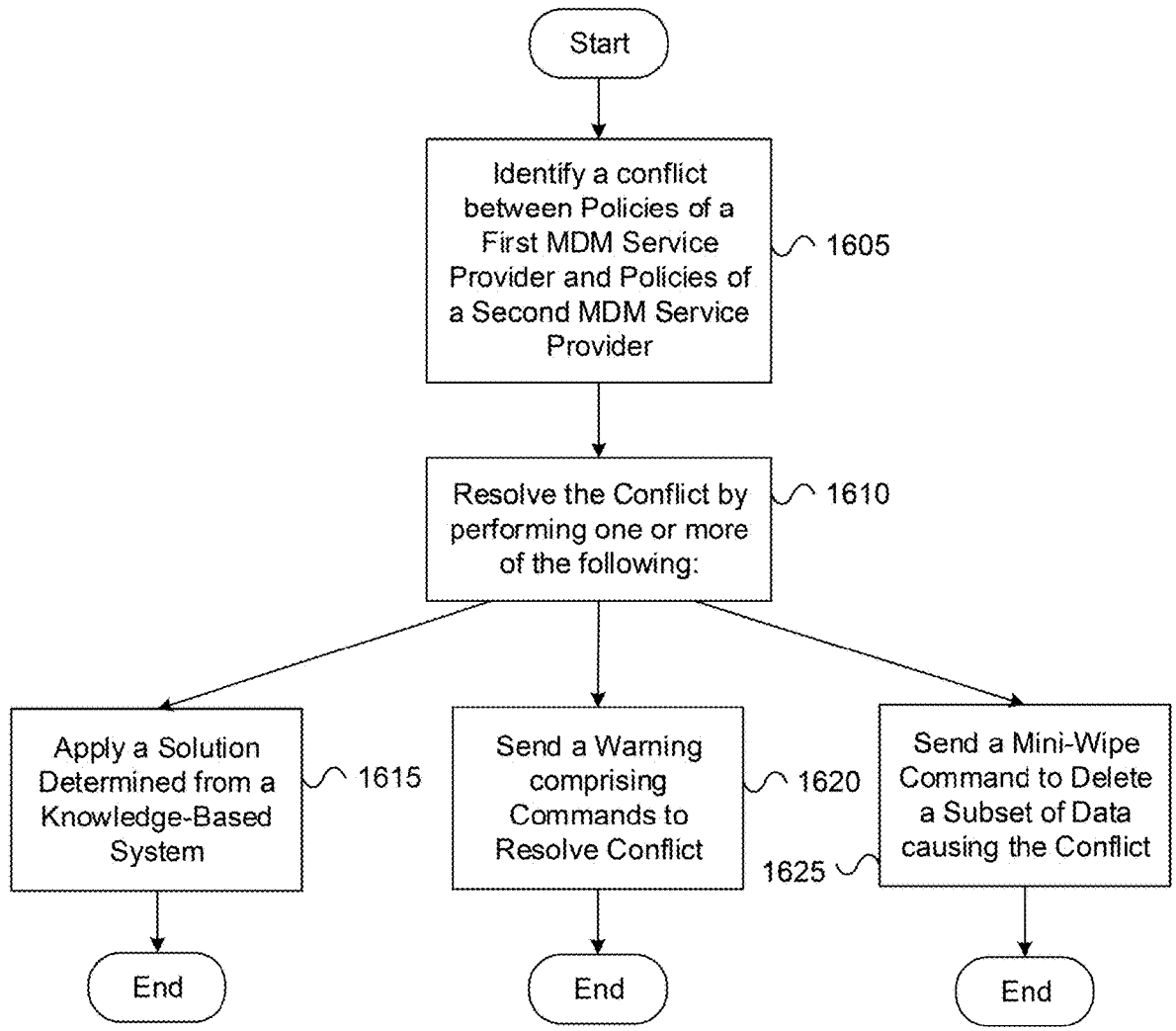
FIG. 16 depicts a flowchart that illustrates a method of resolving a conflict between policies of different mobile device management service providers in accordance with one or more illustrative aspects discussed herein.

FIG. 16 depicts a flowchart that illustrates a method of resolving a conflict between policies of different MDM service providers in accordance with one or more illustrative aspects discussed herein. In one or more embodiments, the method of FIG. 16 and/or one or more steps thereof may be performed by a computing device (e.g., generic computing device 201). In other embodiments, the method illustrated in FIG. 16 and/or one or more steps thereof may be embodied in computer-executable instructions that are stored in a computer-readable medium, such as a non-transitory computer-readable memory.

As seen in FIG. 16, the method may begin at step 1605 in which a pseudo device representative of a physical end user device may identify conflicts in policies of one or more MDM service providers. For example, in step 1605, the pseudo device may identify a conflict between one or more policies of a first MDM service provider and one or more policies of a second MDM service provider. In some embodiments, the pseudo device may identify a conflict between a first policy of the first MDM service provider and a second policy of the first MDM service provider. Similarly, the pseudo device may identify a conflict between a first policy of the second MDM service provider and a second policy of the second MDM service provider.

The pseudo device may identify conflicts between policies based on, for example, inconsistent operations enforced by a policy-enforcement profile, inconsistent commands received from the first MDM service provider, inconsistent commands received from the second MDM service provider, when one or more operations associated with enforcement of a policy-enforcement profile of the first MDM service provider conflicts with one or more operations associated with enforcement of a policy-enforcement profile of the second MDM service provider, when one or more commands received from the first MDM service provider conflicts with one or more commands received from the second MDM service provider, or any combination thereof.

In step 1610, the pseudo device may resolve the identified conflict between the one or more policies of the one or more MDM service providers. For example, in step 1610, the pseudo device may resolve the conflict by performing one or more of the steps 1615, 1620, and/or 1625. The pseudo device may resolve the conflict when the conflict is identified. In some instances, the pseudo device may resolve the conflict when the physical end user device seeks to obtain enterprise resources that may initiate the conflict.

In step 1615, the pseudo device may resolve the conflict by applying a solution determined from a knowledge-based system. For example, in step 1615, the pseudo device may apply a solution determined from a knowledge-based system of the cloud computing environment. The knowledge based system may include a database of rules, policies, and/or other commands that may be applied when conditions of those rules, policies, and/or commands are satisfied. The database may receive updates to existing rules, policies, and/or commands stored within the database. The database may receive new rules, policies, and/or other commands to resolve conflicts.

The pseudo device may apply (e.g., utilize) the rules, policies, and/or commands stored in the database. For example, once the pseudo device has identified a conflict, the pseudo device may query or look up the rules, policies, and/or commands associated with the identified conflict. In response, the pseudo device may receive the rules, policies, and/or commands associated with the identified conflict. The pseudo device may then implement or enforce such rules, policies, and/or commands by, for example, sending one or more commands to the physical end user device. The commands may be configured to enforce, for example, the rules received from the database. Additionally or alternatively, the pseudo device may query one or more of the MDM service providers. The pseudo device may receive a response from the one or more MDM service providers including one or more commands to send to the physical end user device. The pseudo device may then send the commands to the physical end user device. In response to receiving a command, the physical end user device may send to the pseudo device an indication that an operation associated with the one or more commands was completed.

In step 1620, the pseudo device may resolve the conflict by sending a warning to the physical end user device. For example, in step 1620, the pseudo device may send a warning to the physical end user device. The warning may include one or more user-selectable commands to resolve the conflict. For example, the physical end user device may display the warning to the user. The physical end user device may receive a selection by the user of one or more commands displayed to the user in the warning. The physical end user device may then apply the one or more selected commands to resolve the conflict. In some embodiments, based on the one or more commands selected, the physical end user device may send a command or message to the pseudo device and/or one or more of the MDM service providers. In response, the physical end user device may receive one or more commands from the pseudo device and/or the one or more MDM service providers where such commands may be configured to resolve the conflict once operations associated with the commands are applied by the physical end user device.

In step 1625, the pseudo device may resolve the conflict by sending a mini-wipe command to the physical end user device. For example, in step 1625, the pseudo device may send a mini-wipe command to the physical end user device where the mini-wipe commands may be configured to cause at least a subset of data causing the conflict to be deleted. For example, the physical end user device may, based on the received mini-wipe command, delete applications, data associated with applications, resource data of one or more MDM service providers, or any other data causing the conflict.

In some embodiments, the data to be deleted may be sent to the pseudo device to be backed up or stored in memory associated with the pseudo device. When the data may be pushed or sent to the physical end user device without recreating the conflict, the pseudo device may send to the physical end user device at least some of backed up data that was originally deleted by the physical end user device.

In some embodiments, once or when the physical end user device performs one of the options for resolving the conflict discussed herein (e.g., one or more of the steps of 1615, 1620, and/or 1625), the pseudo device may verify that the identified conflict was resolved. For example, the pseudo device may send a request to the physical end user device and receive from the physical end user device current device state information of the physical end user device pertaining to the identified conflict. The pseudo device may then determine based on the current device state information whether the conflict was resolved. If the conflict was not resolved, the pseudo device may again perform any of the methods of resolving a conflict including, for example, one or more of the steps of 1615, 1620, and 1625.

In some embodiments, a second pseudo device representing a second physical end user device may identify a conflict between policies. For example, the second pseudo device may identify conflicts between policies of a first MDM service provider and policies of a second MDM service provider. The second pseudo device may identify conflicting policies from the same MDM service provider. The second pseudo device may resolve the conflict by performing one or more of the following: the second pseudo device may apply a solution determined from a knowledge-based system, the second pseudo device may send a warning including user-selectable commands to resolve the conflict, and/or the second pseudo device may send a mini-wipe command to the second physical end user device so that the second physical end user device may delete a subset of data causing the conflict. The second pseudo device may then verify that the conflict has been resolved.

In some embodiments, only one profile is active at the physical end user device at a time. Additionally or alternatively, multiple profiles may be active at the physical end user device at the same time. In such an instance, the method of FIG. 16 may apply to conflicts arising between multiple profiles concurrently active at the physical end user device. For example, any of steps of 1605-1625 to identify and resolve conflicts may be performed with respect to two or more profiles active at the physical end user device at the same time.

In one or more embodiments, multiple pseudo devices may be established in the cloud computing environment. Each of the pseudo devices in a first group of pseudo devices representing the same first physical end user device. Each of the pseudo devices representing the first physical end user device may be provisioned for use with each MDM service provider. For example, a first pseudo device representing the first physical end user device may be provisioned for use with a first MDM service provider. A second pseudo device representing the first physical end user device may be provisioned for use with a second MDM service provider (different from the first MDM service provider). The first pseudo device may be configured to receive one or more commands from the first MDM service provider on behalf of the of the first physical end user device. The second pseudo device may be configured to receive one or more commands from the second MDM service provider on behalf of the first physical end user device.

In some embodiments, the first pseudo device may receive a first command from the first MDM service provider. The first pseudo device may send to the first physical end user device either the received first command or a different second command based on the first command. The first pseudo device may then receive a response from the first physical end user device. The first pseudo device may send the response or a modified response to the first MDM service provider.

Similarly, in some embodiments, the second pseudo device may receive a third command from the second MDM service provider. The second pseudo device may send to the first physical end user device either the received third command or a different fourth command based on the third command. The second pseudo device may then receive a response from the first physical end user device. The second pseudo device may send the response or a modified response to the second MDM service provider.

In some embodiments, a third pseudo device and a fourth pseudo device may be established in a cloud computing environment and representative of a second physical end user device. Each of the pseudo devices representing the second physical end user device may be provisioned for use with each MDM service provider. For example, a third pseudo device representing the second physical end user device may be provisioned for use with the first MDM service provider. A fourth pseudo device representing the second physical end user device may be provisioned for use with the second MDM service provider. The third pseudo device may be configured to receive one or more commands from the first MDM service provider on behalf of the of the second physical end user device. The fourth pseudo device may be configured to receive one or more commands from the second MDM service provider on behalf of the second physical end user device. The third pseudo device and the fourth pseudo device may receive commands, send commands, receive response, and/or send response as discussed herein.

In some embodiments, the first pseudo device may be provisioned for use with the first MDM service provider. Particularly, the first pseudo device representing the first physical end user device may send a first enrollment request to the first MDM service provider. The first pseudo device may receive a policy-enforcement profile of the first MDM service provider from the first MDM service provider. The first pseudo device may then store the policy-enforcement profile of the first MDM service provider in a memory associated with the first pseudo device. Once provisioned for use with the first MDM service provider, the first pseudo device may access enterprise resources of the first MDM service provider. The first pseudo device may also receive one or more commands from the first MDM service provider to manage the first physical end user device.

In some embodiments, the second pseudo device may be provisioned for use with a second MDM service provider. Particularly, the second pseudo device representing the first physical end user device may send a second enrollment request to the second MDM service provider. The second pseudo device may receive a policy-enforcement profile of the second MDM service provider from the second MDM service provider. The second pseudo device may then store the policy-enforcement profile of the second MDM service provider in a memory associated with the second pseudo device. Once provisioned for use with the second MDM service provider, the second pseudo device may access enterprise resources of the second MDM service provider. The second pseudo device may receive commands from the second MDM service provider to manage the first physical end user device. In some embodiments, the third pseudo device representing the second physical end user device may be provisioned in a similar manner. In some embodiments, the fourth pseudo device representing the second physical end user device may be provisioned in a similar manner.

In some embodiments, the first pseudo device representing the first physical end user device may receive a first command from the first MDM service provider. In response, the first pseudo device may determine whether to send a command (e.g., a second command) to the first physical end user device. In response to a determination to send a second command, the first pseudo device may send the second command to the first physical end user device. The first pseudo device may receive a response from the first physical end user device. The first pseudo device may send the response or a modified response to the first MDM service provider. The response may include an indication that an operation associated with the first command was completed.

As illustrated above, various aspects of the disclosure relate to providing mobile device management functionalities. In other embodiments, however, the concepts discussed herein can be implemented in any other type of computing device (e.g., a desktop computer, a server, a console, a set-top box, etc.). Thus, although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
configuring a remote computing device to logically represent a physical end user device to a plurality of service providers;
configuring the remote computing device, based on a first set of rules defined by a first service provider of the plurality of service providers, to provide control of the end user device to the first service provider, wherein the first set of rules are received at the remote computing device from the first service provider; and
configuring the remote computing device, based on a second set of rules defined by a second service provider of the plurality of service providers, to provide control of the end user device to the second service provider, wherein the second set of rules are received at the remote computing device from the second service provider, and wherein the first set of rules defined by the first service provider and the second set of rules defined by the second service provider conflict such that the remote computing device is unconfigurable using the first set of rules and the second set of rules simultaneously.

2. The method of claim 1, wherein the configuring of the remote computing device based on the first set of rules comprises:
configuring the remote computing device to manage a first application installed on the end user device; and
wherein the configuring of the remote computing device based on the second set of rules comprises:
configuring the remote computing device to manage a second application installed on the end user device.

3. The method of claim 1, wherein the configuring of the remote computing device based on the first set of rules comprises:
configuring a first client agent running on the remote computing device using a first certificate associated with the first service provider; and
wherein the configuring of the remote computing device based on the second set of rules comprises:
configuring a second client agent running on the remote computing device using a second certificate associated with the second service provider.

4. The method of claim 1, wherein the configuring of the remote computing device based on the first set of rules comprises:
configuring the remote computing device to receive first commands from the first service provider to control the end user device; and
wherein the configuring of the remote computing device based on the second set of rules comprises:
configuring the remote computing device to receive second commands sent from the second service provider to control the end user device.

5. The method of claim 4, wherein the first commands from the first service provider and the second commands from the second service provider comprise one or more of:
a command to log data associated with the respective service provider;
a command to provide access to data associated with the respective service provider;
a command to delete data associated with the respective service provider;
a command to prevent screenshots of data associated with the respective service provider;
a command to prevent local transfer of data associated with the respective service provider;

a command to prevent caching data associated with the respective service provider;
a command to prevent disk storage of data associated with the respective service provider; or
a command to terminate a user session associated with the respective service provider.

6. The method of claim 1, further comprising:
determining a conflict between the first set of rules and the second set of rules; and
causing deletion, from the end user device, of data associated with one or more of the first service provider or the second service provider, based on the determined conflict.

7. The method of claim 1, further comprising:
determining a conflict between the first set of rules and the second set of rules; and
sending a request to the end user device, indicating the conflict and providing selectable options for resolving the conflict.

8. The method of claim 1, further comprising:
determining a conflict between the first set of rules and the second set of rules;
modifying, by the remote computing device, a command sent from the respective service provider to the end user device, based on the determined conflict; and
sending, by the remote computing device, the modified command to the end user device.

9. An apparatus, comprising:
one or more processors; and
memory storing instructions that, when executed by the one or more processors, cause the apparatus to:
configure a remote computing device to logically represent a physical end user device to a plurality of service providers;
configure the remote computing device, based on a first set of rules defined by a first service provider of the plurality of service providers, to provide control of the end user device to the first service provider, wherein the first set of rules are received at the remote computing device from the first service provider; and
configure the remote computing device, based on a second set of rules defined by a second service provider of the plurality of service providers, to provide control of the end user device to the second service provider, wherein the second set of rules are received at the remote computing device from the second service provider, and wherein the first set of rules defined by the first service provider and the second set of rules defined by the second service provider conflict such that the remote computing device is unconfigurable using the first set of rules and the second set of rules simultaneously.

10. The apparatus of claim 9, wherein the configuring the remote computing device based on the first set of rules comprises:
configuring the remote computing device to manage a first application installed on the end user device; and
wherein the configuring the remote computing device based on the second set of rules comprises:
configuring the remote computing device to manage a second application installed on the end user device.

11. The apparatus of claim 10, wherein the first commands from the first service provider and the second commands from the second service provider comprise one or more of:

a command to log data associated with the respective service provider; a command to provide access to data associated with the respective service provider;
a command to delete data associated with the respective service provider;
a command to prevent screenshots of data associated with the respective service provider;
a command to prevent local transfer of data associated with the respective service provider;
a command to prevent caching data associated with the respective service provider;
a command to prevent disk storage of data associated with the respective service provider; or
a command to terminate a user session associated with the respective service provider.

12. The apparatus of claim 9, wherein the configuring the remote computing device based on the first set of rules comprises:
configuring a first client agent running on the remote computing device using a first certificate associated with the first service provider; and
wherein the configuring the remote computing device based on the second set of rules comprises:
configuring a second client agent running on the remote computing device using a second certificate associated with the second service provider.

13. The apparatus of claim 9, wherein the configuring the remote computing device based on the first set of rules comprises:
configuring the remote computing device to receive first commands from the first service provider to control the end user device, and
wherein, the configuring the remote computing device based on the second set of rules comprises:
configuring the remote computing device to receive second commands sent from the second service provider to control the end user device.

14. The apparatus of claim 9, wherein the one or more processors are further configured to:
determine a conflict between the first set of rules and second set of rules; and
cause deletion, from the end user device, of data associated with one or more of the first service provider or second service provider, based on the determined conflict.

15. The apparatus of claim 9, wherein the one or more processors are further configured to:
determine a conflict between the first set of rules and second set of rules; and
send a request to the end user device, indicating the conflict and providing selectable options for resolving the conflict.

16. The apparatus of claim 9, wherein the one or more processors are further configured to:
determine a conflict between the first set of rules and second set of rules:
modify, by the remote computing device, a command sent from the respective service provider to the end user device, based on the determined conflict; and
send, by the remote computing device, the modified command to the end user device.

17. A non-transitory computer-readable media storing instructions that, when executed by a computer, cause the computer to perform steps comprising:
configuring, a remote computing device to logically represent a physical end user device to a plurality of service providers;

configuring the remote computing device, based on a first set of rules defined by a first service provider of the plurality of service providers, to provide control of the end user device to the first service provider, wherein the first set of rules are received at the remote computing device from the first service provider; and configuring the remote computing device, based on a second set of rules defined by a second service provider of the plurality of service providers, to provide control of the end user device to the second service provider, wherein the second set of rules are received at the remote computing device from the second service provider, and wherein the first set of rules defined by the first service provider and the second set of rules defined by the second service provider conflict such that the remote computing device is unconfigurable using the first set of rules and the second set of rules simultaneously.

* * * * *